(12) United States Patent
Alpert et al.

(10) Patent No.: US 10,750,522 B2
(45) Date of Patent: Aug. 18, 2020

(54) METHODS AND APPARATUS TO HANDLE ENHANCED DISTRIBUTED CHANNEL ACCESS PARAMETERS

(71) Applicant: Intel Corporation, Santa Clara, CA (US)

(72) Inventors: Yaron Alpert, Petah Tikva (IL); Daniel F. Bravo, Portland, OR (US); Laurent Cariou, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/179,560

(22) Filed: Nov. 2, 2018

(65) Prior Publication Data
US 2019/0075575 A1    Mar. 7, 2019

Related U.S. Application Data

(60) Provisional application No. 62/580,811, filed on Nov. 2, 2017, provisional application No. 62/598,354, filed on Dec. 13, 2017.

(51) Int. Cl.
*H04W 72/12* (2009.01)
*H04W 84/12* (2009.01)
*H04W 74/04* (2009.01)

(52) U.S. Cl.
CPC ....... *H04W 72/12* (2013.01); *H04W 72/1284* (2013.01); *H04W 74/04* (2013.01); *H04W 84/12* (2013.01)

(58) Field of Classification Search
CPC . H04W 72/04; H04W 72/12; H04W 72/1284; H04W 74/04; H04W 84/12
See application file for complete search history.

(56) References Cited

U.S. PATENT DOCUMENTS

| | | | |
|---|---|---|---|
| 10,321,486 B2* | 6/2019 | Cariou | H04W 74/0816 |
| 2016/0198500 A1* | 7/2016 | Merlin | H04W 74/08 370/329 |
| 2017/0245261 A1* | 8/2017 | Cariou | H04W 74/0816 |
| 2017/0273140 A1* | 9/2017 | Ryu | H04W 84/12 |
| 2018/0020428 A1* | 1/2018 | Madhavan | H04W 8/22 |
| 2019/0208571 A1* | 7/2019 | Ahn | H04W 40/244 |
| 2019/0223219 A1* | 7/2019 | Ahn | H04B 7/0452 |

* cited by examiner

*Primary Examiner* — Walli Z Butt
*Assistant Examiner* — Ryan C Kavleski
(74) *Attorney, Agent, or Firm* — Hanley, Flight & Zimmerman, LLC

(57) ABSTRACT

Methods and apparatus to handle enhanced distributed channel access parameters are disclosed. An example apparatus includes a frame generator to generate a data frame instructing a station to operate using a multi-user enhanced distributed channel access (MU EDCA); a communication scheduler to instruct radio architecture to transmit the data frame to the station; the frame generator to generate a buffer status request requesting a buffer status of the station; and the communication scheduler to: instruct radio architecture to transmit the buffer status request to the station; and when a response to the buffer status request corresponds to a non-null queue, scheduling the station to operate using EDCA.

28 Claims, 15 Drawing Sheets

METHODS AND APPARATUS TO HANDLE ENHANCED DISTRIBUTED CHANNEL ACCESS PARAMETERS

RELATED APPLICATIONS

This patent claims priority to and, the benefit of, the earlier filing dates of U.S. Provisional Patent Application Ser. No. 62/580,811, filed on Nov. 2, 2017, and U.S. Provisional Patent Application Ser. No. 62/598,354, filed on Dec. 13, 2017. U.S. Provisional Patent Application Ser. No. 62/580,811 and U.S. Provisional Patent Application Ser. No. 62/598,354 are hereby incorporated herein by reference in their entireties.

FIELD OF THE DISCLOSURE

This disclosure relates generally to wireless fidelity connectivity (Wi-Fi) and, more particularly, to methods and apparatus to handle enhanced distributed channel access parameters.

BACKGROUND

Many locations provide Wi-Fi to connect Wi-Fi enabled devices to networks such as the Internet. Wi-Fi enabled devices include personal computers, video-game consoles, mobile phones and devices, digital cameras, tablets, smart televisions, digital audio players, etc. Wi-Fi allows the Wi-Fi enabled devices to wirelessly access the Internet via a wireless local area network (WLAN). To provide Wi-Fi connectivity to a device, a Wi-Fi access point exchanges radio frequency Wi-Fi signals with the Wi-Fi enabled device within the access point (e.g., a hotspot) signal range. Wi-Fi is implemented using a set of media access control (MAC) and physical layer (PHY) specifications (e.g., such as the Institute of Electrical and Electronics Engineers (IEEE) 802.11 protocol).

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
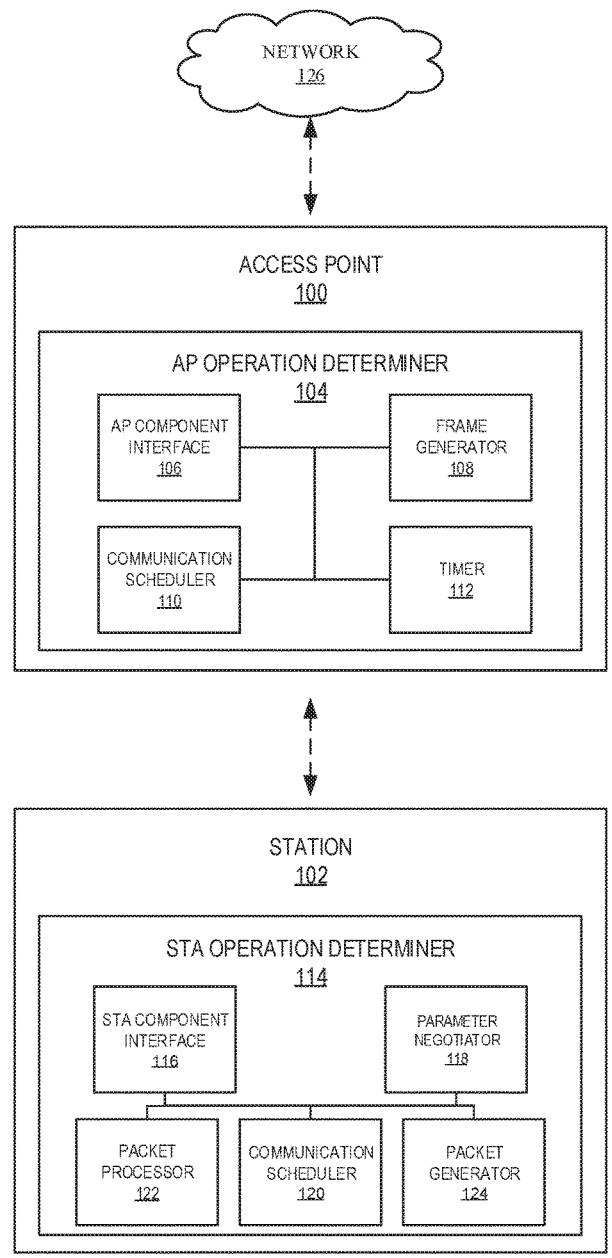
FIG. 1 is an illustration of a system to facilitate communications using wireless local area network (WLAN) Wi-Fi protocols to handle enhanced distributed channel access (EDCA) parameters.

Various locations (e.g., homes, offices, coffee shops, restaurants, parks, airports, etc.) may provide Wi-Fi to Wi-Fi enabled devices (e.g., stations (STA)) to connect the Wi-Fi enabled devices to the Internet, or any other network, with minimal hassle. The locations may provide one or more Wi-Fi access points (APs) to output Wi-Fi signals to the Wi-Fi enabled devices within a range of the Wi-Fi signals (e.g., a hotspot). A Wi-Fi AP is structured to wirelessly connect a Wi-Fi enabled device to the Internet through a wireless local area network (WLAN) using Wi-Fi protocols (e.g., such as IEEE 802.11). The Wi-Fi protocol is the protocol by which the AP communicates with the STAs to provide access to the Internet by transmitting uplink (UL) transmissions and receiving downlink (DL) transmissions to/from the Internet.

A wireless network may include STAs in communication with an AP to access data in a larger network (e.g., the Internet). In a 802.11 WLAN network, a STA communicates via a layered protocol that includes a physical layer (PHY), a medium access control (MAC) layer, and a logical link control (LLC) layer. The MAC layer receives data from the logical link control (LLC) layer, and delivers data to the LLC layer through the MAC service data unit (MSDU). The PHY layer receives data from the MAC and delivers data to the MAC in a PHY SDU (PSDU). Protocol entities in one device exchange data and control information with their peer entities in another device via protocol data units (PDUs). The MAC entity exchanges MAC PDUs (MPDUs) with its peer and the PHY entities exchanges PHY PDUs (PPDUs) with its peer.

The IEEE 802.11 standard and the relevant regulation define a set of rules that determine how to access an unlicensed medium to send and receive data and the details of transmission and reception format (BW, TX power, etc.). At the MAC layer, transmissions in an 802.11 network are in the form of MAC frames of which there are three main types: data frames, control frames, and management frames. Data frames carry data from station to station. Control frames, such as request-to-send (RTS) and clear-to-send (CTS) frames, are used in conjunction with data frames to deliver data reliably from station to station. Management frames are used to perform network management functions. Management frames include beacon frames that are transmitted periodically by the AP at defined beacon intervals, contain information about the network, and indicate whether the AP has buffered data that is addressed to a particular station(s). Other management frames include probe request frames sent by a station probing for the existence of a nearby AP and probe response frames sent by an AP in response to a probe request frame.

Legacy 802.11 networks utilize a CSMA/CA (carrier sense multiple access/collision avoidance) unlicensed medium access (i.e. channel access) mechanism in the MAC layer referred to as the distributed coordination function (DCF). DCF allows a device (e.g., a STA and/or an AP) with information to transmit first to perform a clear channel assessment (CCA) by sensing the channel medium for a specified duration called the DCF inter-frame space (DIFS). If the medium is idle during DCF, then the device may access the medium and begins a frame exchange sequence. If the medium is busy, the device waits for the medium to go idle, defers to the DIFS, and waits for a further random backoff period.

To begin the random backoff procedure, the station selects a random backoff count in a range defined by the contention window (CW). During each backoff time slot (e.g., a predetermined duration of time where backoff can occur), the device continues to monitor the medium. If the medium becomes busy during a backoff slot then the backoff procedure is suspended. The backoff count is resumed when the medium goes idle again for a DIFS period. If the medium remains idle for the DIFS deferral and the backoff period, the station then accesses the medium and begins a frame exchange sequence.

Enhanced distributed channel access (EDCA) is an extension of the basic DCF to support prioritized quality of service (QoS). In addition to DCF operations, the EDCA unlicensed medium access mechanism defines four access categories (ACs) and each AC is characterized by specific values for a set of access parameters that statistically prioritize medium access for one AC over another. For example, lower priority data will receive a lower AC and higher priority data will receive a higher AC. MSDUs are prioritized over medium access by being assigned to a higher priority AC. Additionally, contention windows (CWs) for use in the backoff procedure described above are defined for each AC. Different ACs may have different CW lengths. For example, higher priority ACs may have longer CWs.

The 802.11ax standard provides for downlink (DL) and uplink (UL) multi-user (MU) operation. This means that, multiple simultaneous transmissions are made to different STAs from the AP in the DL and transmissions are made from multiple STAs to the AP in the UL via MU-MIMO and/or orthogonal frequency division multiple access (OFDMA). In OFDMA operations, the AP assigns separate subsets of OFDMA subcarriers, referred to as resource units (RUs), to individual STAs for UL and DL transmissions. In MU-MIMO operations, multiple antenna beamforming techniques are used to form spatial streams (SSs) that an AP assigns to STAs for UL and DL transmissions.

In single-user (SU) operations, STAs and APs are responsible for scheduling their own transmissions by contending for the medium in accordance with the DCF or EDCA unlicensed medium access mechanisms described above. To implement the UL and DL MU operations as defined by the 802.11ax standard and disclosed above, the AP is more involved than in previous standard in scheduling UL and DL data transfers. For example, the AP communicates with all connected STAs and schedules the UL and DL data transfers. A STA in an 802.11ax network can also rely more on AP scheduling for STA medium access. The current IEEE 802.11ax specification describes a multi-user (MU) protection procedure based on transmission of MU-RTS (which is a trigger frame subtype) by the AP to initiate simultaneous CTS responses from multiple STAs. The MU-RTS/CTS procedure allows a high-efficiency (HE) AP to protect its MU transmission for HE STAs.

In MU operations, an AP accesses the medium to send a trigger frame to STAs. The trigger frame triggers UL transmissions from multiple STAs to the AP. Thus, the medium access function is transferred to the AP side and managed by the AP EDCA function (EDCAF). However, STAs have conventionally had an EDCAF to access the medium in the UL to send SU PPDUs to the AP. When HE STAs are UL MU capable, they can either access the medium with their EDCAF to send an SU PPDU to the AP, or the HE STAs can scheduled in UL MU by the reception of a trigger frame from the AP.

Improved efficiency can be obtained by forcing HE STAs to modify their EDCA parameters, in order to favor UL MU operations in place of UL SU operations. However, legacy STAs need to be able use normal EDCA parameters, in order not to be disfavored by APs. In some examples described herein, STAs are provided with two sets of EDCA parameters: legacy EDCA parameters and MU EDCA parameters. Legacy EDCA parameters are utilized for SU operations and may be used by both HE STAs and legacy STAs without MU capability. MU EDCA parameters are defined to be more restrictive than legacy EDCA parameters in favoring MU operations (e.g., when operating with EDCA parameters, a STA has less chances to access the medium compared to when the STA is using EDCA parameters).

Conventionally, an HE STA dynamically selects from the different sets of parameters depending on specific conditions. For example, the HE STA may operate with the MU EDCA parameters only for the MSDUs in the queue of the HE STA that the AP is aware of. That is, the STA lets the AP efficiently schedule traffic for the STA via UL MU operations. Using such conventional techniques, the HE STA then operates with the legacy EDCA parameters for all MSDUs for which the AP has been informed. For example, every time a new MSDU arrives in an empty AC (access category), the conventional STA can access the medium with the legacy EDCA parameters to transmit this MSDU in SU mode. As the MSDUs accumulate in the STAs queue for that AC, the STA, as part of its UL SU transmission or via other ways such as a response to a short resource request trigger or to a buffer status feedback request, informs the conventional AP that it has some traffic to send. When the conventional STA receives a trigger frame scheduling the STA for an AC, the STA switches to MU EDCA parameters only for that AC. However, such conventional techniques are not efficiently utilizing the new frequency bands because the first transmission of a burst will likely be transmuted with EDCA, thereby interfering with incumbent devices in the new frequency bands.

As currently licensed bands open for unlicensed operation (e.g., bands between the 6 Gigahertz (GHz) and 7 GHz range), a two-step approach may be used to introduce Wi-Fi to such bands. The first step includes using known protocols (e.g., 11ax) in the band by defining a new channelization to include a standard for a quick transition into the market so that products can quickly introduced. In such quick transitions, hardware of 11ax devices should be operable in the newly available bands, as well as in the existing bands. This backward hardware compatibility will facilitate software updates to quickly provide operation in the new bands. The second step includes defining a new greenfield (e.g., or semi-greenfield) Wi-Fi standard in the new band (e.g., defined by a committee standard). In this manner, legacy devices can be removed to start a new design with (A) an improved PHY to adapt to the requirements of the band (e.g., providing incumbents protection with the non-incumbent operation) and (B) an improved MAC layer to improve scheduling, spatial reuse, predictability, etc.

Examples disclosed herein ensure that the presence of new, unlicensed operation devices in a previously licensed band will not impact the benefits/gains of greenfield standards. For example, examples disclosed herein control STAs to ensure that such devices will not interfere with legacy devices in the band. Examples disclosed herein include process for preventing STAs from controlling EDCA medium (e.g., channel) access and allowing the AP to have full control over the EDCA medium access. MU EDCA is more restrictive than EDCA. Thus, a STA using MU EDCA has fewer chances to access the medium when operating under MU EDCA, thereby decreasing the probability of impacting legacy devices in the frequency band. Examples disclosed herein include defining a first transition from EDCA to MU EDCA parameters for a particular AC when the STA is triggered for data transmission and a second transition from MU EDCA parameters to EDCA parameters for a particular AC based on instructions from the AP.

Examples disclosed herein include an AP system with processes to force STAs to use MU EDCA parameters instead of EDCA parameters for a long duration of time. For example, the AP communicates with the APs to control whether the STAs use MU EDCA parameters or EDCA parameters. In exchange, the AP will ensure the handling of the STA's access to the wireless medium for its UL traffic using UL triggered access. In this manner, the AP will poll the STA for buffer status feedback and trigger the STA for EDCA data transmission when non-null queues are reported. In some examples, the AP defines the polling parameters in EDCA/MU EDCA control frame. In some examples, the AP negotiates the polling parameters with the STA using the EDCA/MU EDCA control frame. Examples disclosed herein provide a more static protocol than conventional techniques, thereby ensuring that the STA will have minimum performance/channel access latency, without degrading incumbent device communications in a new frequency band. Examples disclosed herein further provide a protocol for adjusting MU EDCA and/or EDCA parameters for use between an AP and a STA.

FIG. 1 illustrates communications using wireless local area network Wi-Fi protocols to handle enhanced distributed channel access parameters. FIG. 1 includes an example access point 100, an example STA 102, an example AP operation determiner 104, an example AP component interface 106, an example frame generator 108, an example communication scheduler 110, an example timer 112, an example STA operation determiner 114, an example STA component interface 116, an example parameter negotiator 118, an example communication scheduler 120, an example packet processor 122, an example packet generator 124, and an example network 126.

The example AP 100 of FIG. 1 is a device that allows the example STA 102 to access the example network 126 (e.g., the Internet). The example AP 100 may be a router, a modem-router, and/or any other device that provides a wireless connection to the example network 126. A router provides a wireless communication link to a STA. The router accesses the network 126 through a wire connection via a modem. A modem-router combines the functionalities of the modem and the router. The example AP 100 includes the example AP operation determiner 104, as further described below.

The example STA 102 of FIG. 1 is a Wi-Fi enabled computing devices. The example STA 102 may be, for example, a computing device, a portable device, a mobile device, a mobile telephone, a smart phone, a tablet, a gaming system, a digital camera, a digital video recorder, a television, a set top box, an e-book reader, and/or any other Wi-Fi enabled device. The example STA 102 communicates with the example AP 100 to access the example network 126 (e.g., the Internet). The example STA may be an HE STA or a non-HE STA. The example STA includes the example STA operation determiner 114, as further described below.

The example AP operation determiner 104 of FIG. 1 controls the operation of the example STA 102 by scheduling the example STA 102 to use MU EDCA or EDCA based on EDCA/MU EDCA parameters. Additionally, the example AP operation determiner 104 updates the MU EDCA or EDCA parameters using an parameter updating protocol. The example AP operation determiner 104 includes the example AP component interface 106, the example frame generator 108, the example communication scheduler 110, and the example timer 112. The example AP component interface 106 interfaces with components of the example AP 100 (e.g., the example radio architecture 1100 of FIG. 11) to transmit data/frame(s)/packet(s) to the example STA 102 and/or receive data/frame(s)/packet(s) from the example STA 102. In some examples, the AP component interface 106 interfaces with a processor (e.g., the example application processor 1110 of FIG. 11) of the example AP 100 to transmit/receive instructions.

The example frame generator 108 of FIG. 1 generates an EDCA/MU EDCA frame to be transmitted to the example STA 102. The EDCA/MU EDCA includes the EDCA/MU EDCA parameters corresponding to how the example STA 102 will operate. For example, the EDCA/MU EDCA includes data related to how often the example AP 100 will poll the example AP 100 for buffer status data, which AC categories will operate under MU EDCA, which AC categories will operate under EDCA, etc. In some examples, the frame generator 108 generates the EDCA/MU EDCA frame based on network parameters. The STA 102 may operate in a polling node with EDCA/MU EDCA transitions based on a polling protocol of the example AP 100 or the example STA 102 may operate in a dynamic mode where the STA 102 contends for the medium and facilitates the EDCA/MU EDCA transitions. The frame generator 108 may set forth the EDCA/MU EDCA parameters to correspond to how busy the network is (e.g., the number of data transmissions, the number of STAs, the number of APs, etc. within a threshold distance of the example AP 100). Once the frame generator 108 generates the EDCA/MU EDCA frame, the example AP component interface 106 interfaces with the AP components (e.g., the example radio architecture 1100 of FIG. 11) to transmit the generated frame. In some examples, in response to receiving a negotiation response from the example STA 102, the example frame generator 108 adjusts the EDCA/MU EDCA parameters based on the negotiation response. For example, if the negotiation response corresponds to a smaller duration of time between buffer status requests, the example frame generator 108 can determine if such a request is possible and may adjust the parameters to match the request or more closely match the request. Additionally, when the communication scheduler 110 determines that the MU EDCA parameters or the EDCA parameters should be updated (e.g., based on instructions from the application processor 1110 of FIG. 11 and/or a change in network conditions), the example frame generator 108 generates an EDCA and/or MU EDCA element that includes a count corresponding to the current MU EDCA and/or EDCA parameters. The example STA 102 tracks the count, as further described below. In this manner, if the count tracked by the STA 102 is different than the count in a received element from the AP 100, the STA 102 will be alerted to the change in parameters and request and/or negotiate the new parameters from the AP 100.

The example communication scheduler 110 of FIG. 1 schedules the EDCA/MU EDCA operation of the example STA 102 based on the EDCA/MU EDCA parameters of the generated EDCA/MU EDCA frame. For example, the example communication scheduler 110 instructs the example AP component interface 106 to poll the STA by transmitting buffer status requests to the example STA 102 corresponding to a schedule identified in the EDCA/MU EDCA parameters. After the example communication scheduler 110 transmits the buffer status request, the example communication scheduler 110 processes a buffer status response to determine if the buffer includes UL data packets in its queue based on the EDCA/MU EDCA parameters. If the queue is null, the communication scheduler 110 continues to poll the STA 102 based on the schedule of the EDCA/MU EDCA parameters while the STA 102 operates using MU EDCA operation. If the queue is not null, the communication scheduler 110 schedules the STA 102 to operate using EDCA operation (e.g., by instructing the radio architecture 1100 of FIG. 11 to transmit a control frame to the STA 102 via the example AP component interface 106). In some examples, only certain AC categories may correspond to the polling mode with default MU EDCA operation with a polling protocol for transitioning to EDCA operation (e.g., while others operate using a conventional dynamic approach controlled by the example STA 102). In such examples, the STA 102 may transmit buffer status data only corresponding to the polled AC category and/or may transmit buffer status data corresponding to any data being in the buffer. Accordingly, in some examples, the communication scheduler 110 may transition from MU EDCA to EDCA based on a specific AC category (e.g., identified for polling mode in a EDCA/MU EDCA frame). In some examples, the communication scheduler 110 may transition based on any data in the buffer (e.g., regardless of AC category). Additionally, the communication scheduler 110 may determine when to switch EDCA parameters and/or MU EDCA parameters based on a duration of time, instructions from the example processor 1110 of FIG. 11, changes in network characteristics, etc. When the example communication scheduler 110 updates the MU EDCA parameters and/or EDCA parameters, the communication scheduler 110 increments a corresponding count, which is then transmitted to the connected STAs (e.g., the example STA 102) to identify the parameter update.

The example timer 112 of FIG. 1 tracks time. For example, the timer 112 may trigger when a duration of time has elapsed (e.g., corresponding to a trigger to send a buffer status request). In some examples, the timer 112 may generate a trigger corresponding to a duration of time between when the example STA 102 reports a non-null buffer status for a particular AC (e.g., scheduled for the polling protocol) and when the AP 100 will send a basic trigger frame. Additionally, the timer 112 may be used to update the MU EDCA parameters and/or EDCA parameters based on a pre-set amount of time.

The example STA operation determiner 114 of FIG. 1 operates using MU EDCA and/or EDCA based on EDCA/MU EDCA parameters of a received EDCA/MU EDCA frame from the example AP 100. Additionally, the example STA operation determiner 114 tracks a count corresponding to the MU EDCA parameters and/or the EDCA parameters to determine when the parameters have been updated or will be updated by the example AP 100. The example STA operation determiner 114 includes the example STA component interface 116, the example parameter negotiator 118, the example communication scheduler 120, the example packet processor 122, and the example packet generator 124. The example STA component interface 116 interfaces with components of the example STA 102 (e.g., the example radio architecture 1100 of FIG. 11) to transmit data/frame(s)/packet(s) to the example AP 100 and/or receive data/frame(s)/packet(s) from the example AP 100. In some examples, the STA component interface 116 interfaces with a processor (e.g., the example application processor 1110 of FIG. 11) of the example STA 102 to transmit/receive instructions.

The example parameter negotiator 118 of FIG. 1 negotiates EDCA/MU EDCA parameters based on STA and/or user preferences. For example, the STA 102 may desire a target parameter(s) (e.g., a target duration of time between buffer requests, particular ACs that the STA 102 desires conventional dynamic EDCA operation, etc.). Accordingly, if a received EDCA/MU EDCA frame from the example AP 100 corresponds to EDCA/MU EDCA parameters that do not match the desired parameters of the example STA 102, the example parameter negotiator 118 generates a negotiation response identifying the desired parameters. In this manner, the example AP 100 can attempt to satisfy the desired parameters or adjust the EDCA/MU EDCA parameters to more closely match the desired parameters.

The example communication scheduler 120 of FIG. 1 schedules the EDCA/MU EDCA operation based on the EDCA/MU EDCA parameters of the generated EDCA/MU EDCA frame. For example, when the example STA component interface 116 receives the EDCA/MU EDCA frame that corresponds to one or more AC categories that are scheduled for MU EDCA with AP controlled polling (e.g., polling mode), the example communication scheduler 129 facilitates MU EDCA operation for the one or more AC categories. When the example STA component interface 116 receives a buffer data request from the example AP 100, the example communication scheduler 120 determines whether there is data stored in a buffer (e.g., corresponding to the example local memory 1513 of FIG. 15) for transmission. The example communication scheduler 120 transmits a buffer status response via the example STA component interface 116 to the example AP 100. The buffer status may correspond to AC categories that are marked for MU EDCA operation with AP controlled polling or may correspond to all AC categories. When the example STA component interface 116 receives a trigger frame to adjust from MU EDCA operation to EDCA operation, the example communication scheduler 120 facilitates the EDCA operation. During EDCA operation, the example communication scheduler 120 piggybacks buffer data on UL data transmitted to the example AP 100, so that the AP 100 can determine when to transition back to MU EDCA operation. The example communication scheduler 120 transitions back to MU EDCA operation based on instructions from the example AP 100 (e.g., via a transmitted trigger frame, a new EDCA/MU EDCA frame, etc.). Additionally, the example communication scheduler 120 determines when the MU EDCA or EDCA parameters should be updated by comparing a tracked count to a received count of an EDCA/MU EDCA element from the example AP 100. In this manner, when the counts differ, the communication scheduler 120 instructs the packet generator 124 to generate a probe request for the updated parameters.

The example packet processor 122 of FIG. 1 processes data packets, frames, signals, etc. received from the example AP 100. For example, when the STA component interface 116 receives EDCA/MU EDCA parameters, the example packet processor 122 processes the received data packet to determine what the EDCA/MU EDCA parameters are. In another example, when a buffer request is received, the example packet processor 122 processes the received packet to determine that the packet is a buffer request. Additionally, the packet processor 122 may determine, based on a trigger frame, whether the received trigger frame corresponds to operating using EDCA parameters or MU EDCA parameters. When a received element corresponds to a EDCA parameter or MU EDCA parameter update, the example packet processor 122 determines which parameters are to be updated (e.g., EDCA or MU EDCA) and identifies a count from the received element.

The example packet generator 124 of FIG. 1 generates data packets to be transmitted to the example AP 100. For example, in response to a buffer status request, the example packet generator 124 generates a data packet corresponding to whether there is data in the buffer and/or how much data is stored in the buffer. Additionally, the example packet generator 124 may generate packets for the negotiation process (e.g., to adjust selected EDCA and/or MU EDCA parameters). Additionally, the example packet generator 124 may generate a probe request in response to the communication scheduler 120 determining that a stored count differs from a count in a received element.

The example network 126 of FIG. 1 is a system of interconnected systems exchanging data. The example network 126 may be implemented using any type of public or private network such as, but not limited to, the Internet, a telephone network, a local area network (LAN), a cable network, and/or a wireless network. To enable communication via the network 126, the example Wi-Fi AP 100 includes a communication interface that enables a connection to an Ethernet, a digital subscriber line (DSL), a telephone line, a coaxial cable, or any wireless connection, etc.

While an example manner of implementing the example AP operation determiner 104 and the example STA operation determiner 114 of FIG. 1 are illustrated in FIG. 1, one or more of the elements, processes and/or devices illustrated in FIG. 1 may be combined, divided, re-arranged, omitted, eliminated and/or implemented in any other way. Further, the example AP component interface 106, the example frame generator 108, the example communication scheduler 110, the example timer 112, and/or, more generally, the example AP operation determiner 104 of FIG. 1 and/or the example STA component interface 116, the example parameter negotiator 118, the example communication scheduler 120, the example packet processor 122, the example packet generator 124, and/or, more generally, the example STA operation determiner 114 of FIG. 1 may be implemented by hardware, software, firmware and/or any combination of hardware, software and/or firmware. Thus, for example, any of the example AP component interface 106, the example frame generator 108, the example communication scheduler 110, the example timer 112, and/or, more generally, the example AP operation determiner 104 of FIG. 1 and/or the example STA component interface 116, the example parameter negotiator 118, the example communication scheduler 120, the example packet processor 122, the example packet generator 124, and/or, more generally, the example STA operation determiner 114 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one the example AP component interface 106, the example frame generator 108, the example communication scheduler 110, the example timer 112, and/or, more generally, the example AP operation determiner 104 of FIG. 1 and/or the example STA component interface 116, the example parameter negotiator 118, the example communication scheduler 120, the example packet processor 122, the example packet generator 124, and/or, more generally, the example STA operation determiner 114 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AP component interface 106, the example frame generator 108, the example communication scheduler 110, the example timer 112, and/or, more generally, the example AP operation determiner 104 of FIG. 1 and/or the example STA component interface 116, the example parameter negotiator 118, the example communication scheduler 120, the example packet processor 122, the example packet generator 124, and/or, more generally, the example STA operation determiner 114 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example AP operation determiner 104 and/or the example STA operation determiner 114 of FIG. 1 are shown in FIGS. 2-8. In this example, the machine readable instructions comprise a program for execution by a processor such as the processor 1512 shown in the example processor platform 1500 discussed below in connection with FIG. 15. The program may be embodied in software stored on a non-transitory computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 2-8, many other methods of implementing the example AP operation determiner 104 and/or the example STA operation determiner 114 of FIG. 1 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 2-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 2:
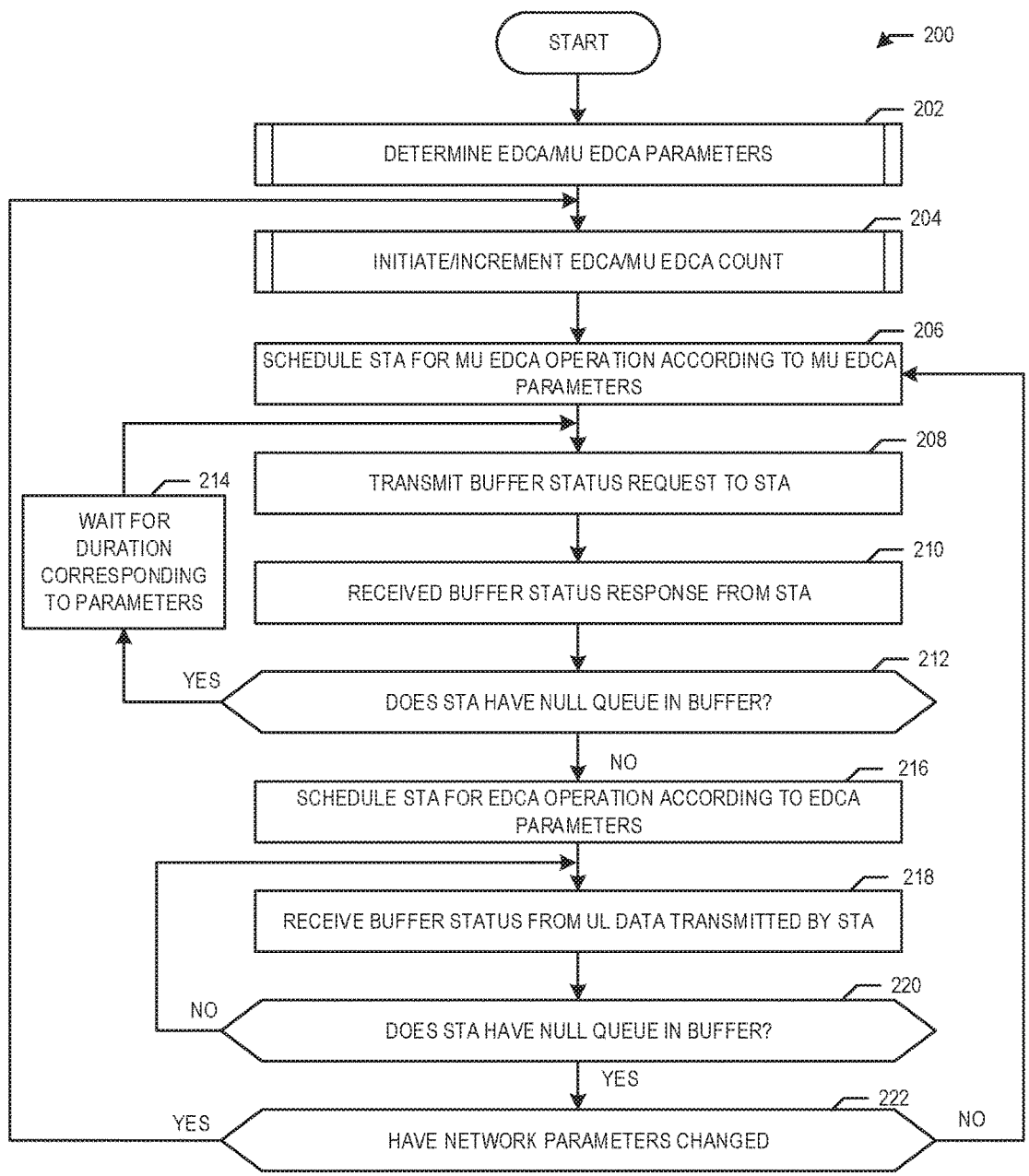
FIGS. 2-4 are flowcharts representative of example machine readable instructions that may be executed to implement the example access point (AP) operation determiner of FIG. 1.

FIG. 2 is an example flowchart 200 representative of example machine readable instructions that may be executed by the example AP operation determiner 104 of FIG. 1 to handle enhanced distributed channel access parameters. The flowchart 200 is described in conjunction with the example AP operation determiner 104 being implemented by the example AP 100 of FIG. 1. Additionally or alternatively, the flowchart 200 may be implemented by any type of AP in any network.

At block 202, the example AP operation determiner 104 determines EDCA/MU EDCA parameters, as further described below in conjunction with FIG. 3. As described above, the AP operation determiner 104 selects EDCA and/or MU EDCA parameters based on network parameters/characteristics However, the selected parameters may not match desired parameters of a STA. Accordingly, the AP operation determiner 104 may negotiate the EDCA and/or MU EDCA parameters with a STA. At block 204, the example AP operation determiner 104 initiates and/or increments the EDCA/MU EDCA count, as further described below in conjunction with FIG. 4. The example AP operation determiner 104 may update the EDCA/MU EDCA count when the EDCA and/or MU EDCA parameters are to change (e.g., based on the network parameters/characteristics changing, a preset duration of time occurring, instructions from another processor, etc.). Accordingly, the incrementation protocol of FIG. 4 may occur whenever the network parameters change.

At block 206, the example communication scheduler 110 schedules the example STA 102 for MU EDCA operation according to the MU EDCA parameters (e.g., the marked ACs). At block 208, the example AP component interface 106 interfaces with the AP components to transmit a buffer status request to the example STA 102. For example, the AP component interface 106 may transmit instructions from the communication scheduler 110 to transmit the buffer status request using the radio architecture 1100 of FIG. 11. At block 210, the example communication scheduler 110 receives the buffer status response from the example STA 102 via the AP component interface 106. For example, the AP component interface 106 may obtain the buffer status response received by the example radio architecture 1100 of FIG. 11. At block 212, the example communication scheduler 110 determines if the STA 102 has a null queue in its buffer based on the buffer status response (e.g., the buffer of the STA 102 does not include UL data packets to be transmitted to the AP 100). If the example communication scheduler 110 determines that the STA 102 has a null queue (block 212: YES), the example timer 112 waits for the duration of time corresponding to the EDCA/MU EDCA parameters (block 214) before transmitting a subsequent buffer status request. If the example communication scheduler 110 determines that the STA 102 does not have a null queue (block 212: NO), the example communication scheduler 110 schedules the STA 102 for EDCA operation according to the EDCA parameters (block 216).

Figure 11:
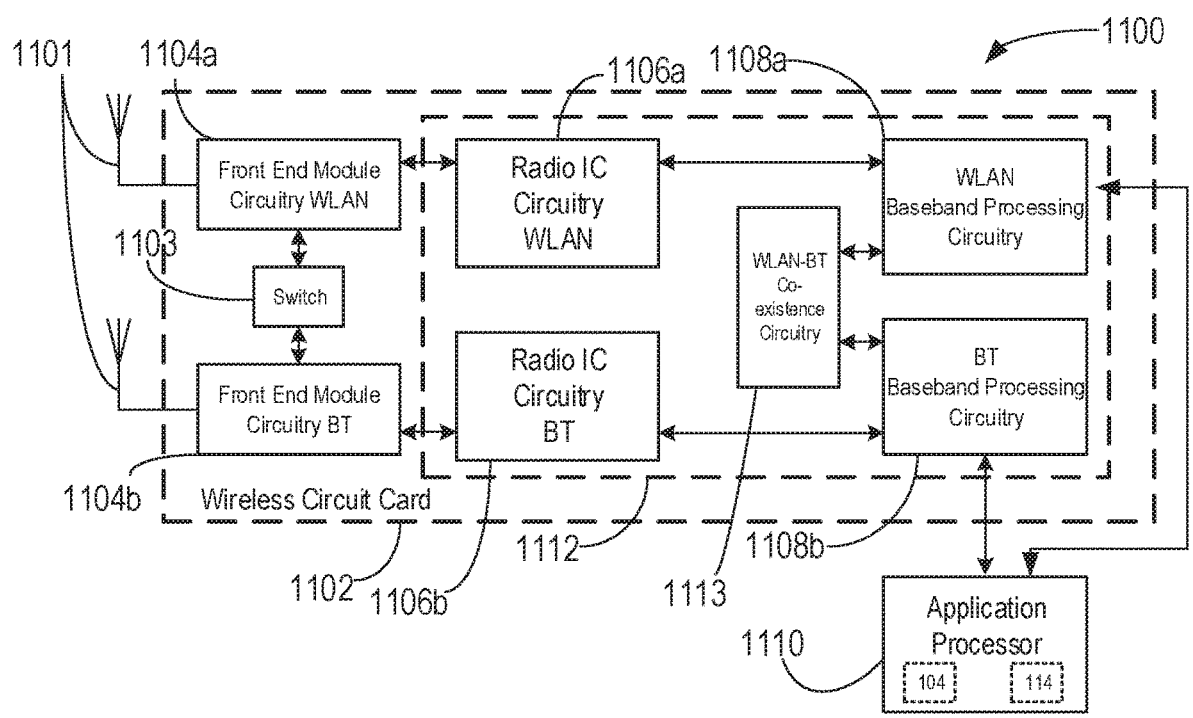
FIG. 11 is a block diagram of a radio architecture in accordance with some examples.

At block 218, the example AP component interface 106 receives a buffer status from the UL data transmitted by the example STA 102 via the radio architecture 1100 of FIG. 11. For example, the AP component interface 106 obtains the buffer status from the UL data via the radio architecture 1100 of FIG. 11. At block 220, the communication scheduler 110 determines if the STA 102 has a null queue in its buffer based on the buffer status. If the example communication scheduler 110 determines that the STA 102 does not have a null queue (block 220: NO), the process returns to block 218 until the buffer status corresponds to a null queue. In some examples, the AP operation determiner 104 may transmit a buffer status request after a duration of time if the STA 102 has been operating using EDCA for more than a threshold duration of time. If the example communication scheduler 110 determines that the STA 102 has a null queue (block 220: YES), the example frame generator 108 determines if the network parameters have changed (e.g., corresponding to an update to the EDCA/MU EDCA parameters) (block 222). If the example frame generator 108 determines that the network parameters have changed (block 222: YES), the process returns to block 204 to generate a new EDCA/MU EDCA frame corresponding to updated network parameters. If the example frame generator 108 determines that the network parameters have not changed (block 222: NO), the process returns to block 206 to continue the scheduling of the example STA 102 for MU EDCA operation according to the MU EDCA parameters.

Figure 3:
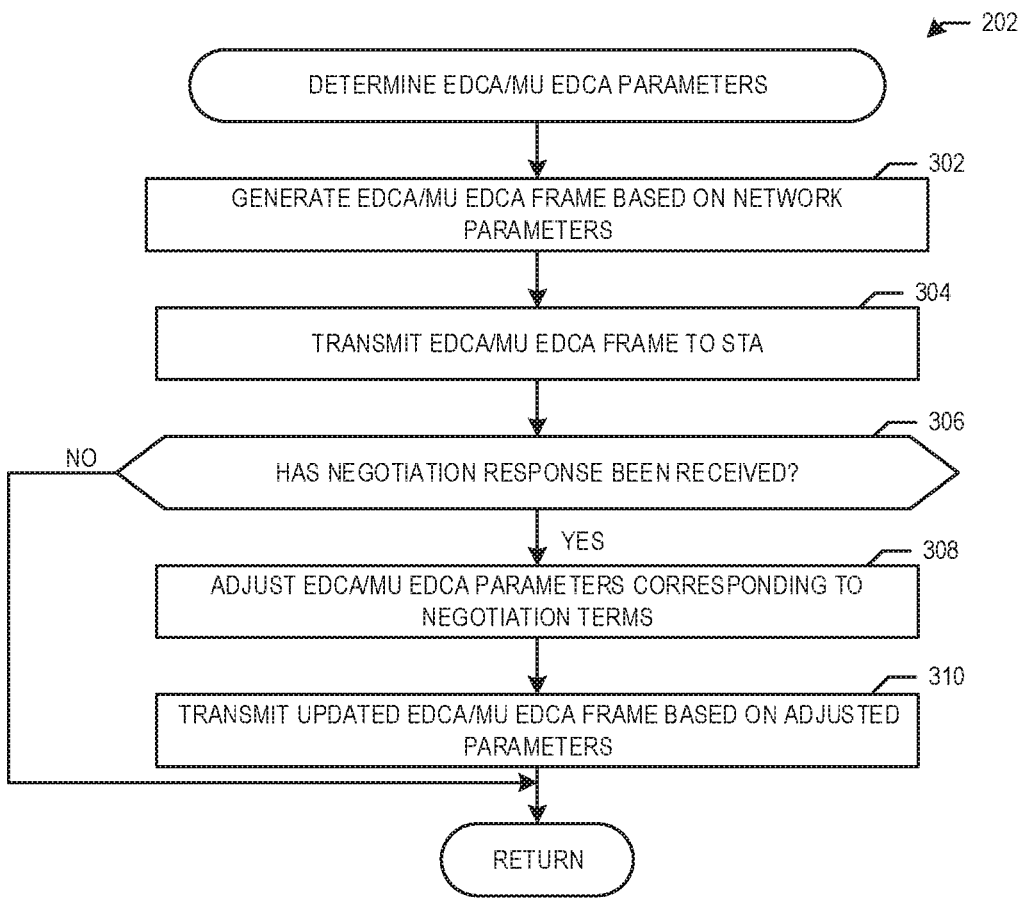

FIG. 3 is an example flowchart 202 representative of example machine readable instructions that may be executed by the example AP operation determiner 104 of FIG. 1 to determine EDCA and/or MU EDCA parameters, as further described above in conjunction with block 202 of FIG. 2. The flowchart 202 is described in conjunction with the example AP operation determiner 104 being implemented by the example AP 100 of FIG. 1. Additionally or alternatively, the flowchart 202 may be implemented by any type of AP in any network.

At block 302, the example frame generator 108 generates an EDCA/MU EDCA frame based on network parameters. As explained above, the EDCA/MU EDCA frame identifies EDCA/MU EDCA parameters corresponding to which ACs should operate under polling mode (e.g., default MU EDCA operation, as well as the timing parameters corresponding to when the AP 100 will trigger a buffer status from the STA 102 to determine if a EDCA transition is necessary). At block 304, the example AP component interface 106 transmits the EDCA/MU EDCA frame to the example STA 102 using the AP components. For example, the AP component interface 106 may transmit the EDCA/MU EDCA frame to the example STA 102 using the example radio architecture 1100 of FIG. 11.

At block 306, the example AP component interface 106 determines if a negotiation response from the example STA 102 has been received via the radio architecture 1100 of FIG. 11. If the example AP component interface 106 determines that a negotiation response has not been received (block 306: NO), the process returns to block 204 of FIG. 2. If the example AP component interface 106 determines that a negotiation response has been received (block 306: YES), the example frame generator 108 processes the response to determine if the EDCA/MU EDCA can be adjusted to meet, or come closer to, the parameters identified in the negotiation response. If the parameters can be adjusted, the example frame generator 108 adjusts the EDCA/MU parameters corresponding to the negotiation terms (block 308). At block 310, the example AP component interface 106 interfaces with the radio architecture 1100 to transmit an updated EDCA/MU EDCA frame based on the adjusted parameters. In some examples, the negotiation process may be repeated multiple times (e.g., until a compromise is met and/or after a preset number of exchanges). After block 310, the process returns to block 204 of FIG. 2.

Figure 4:
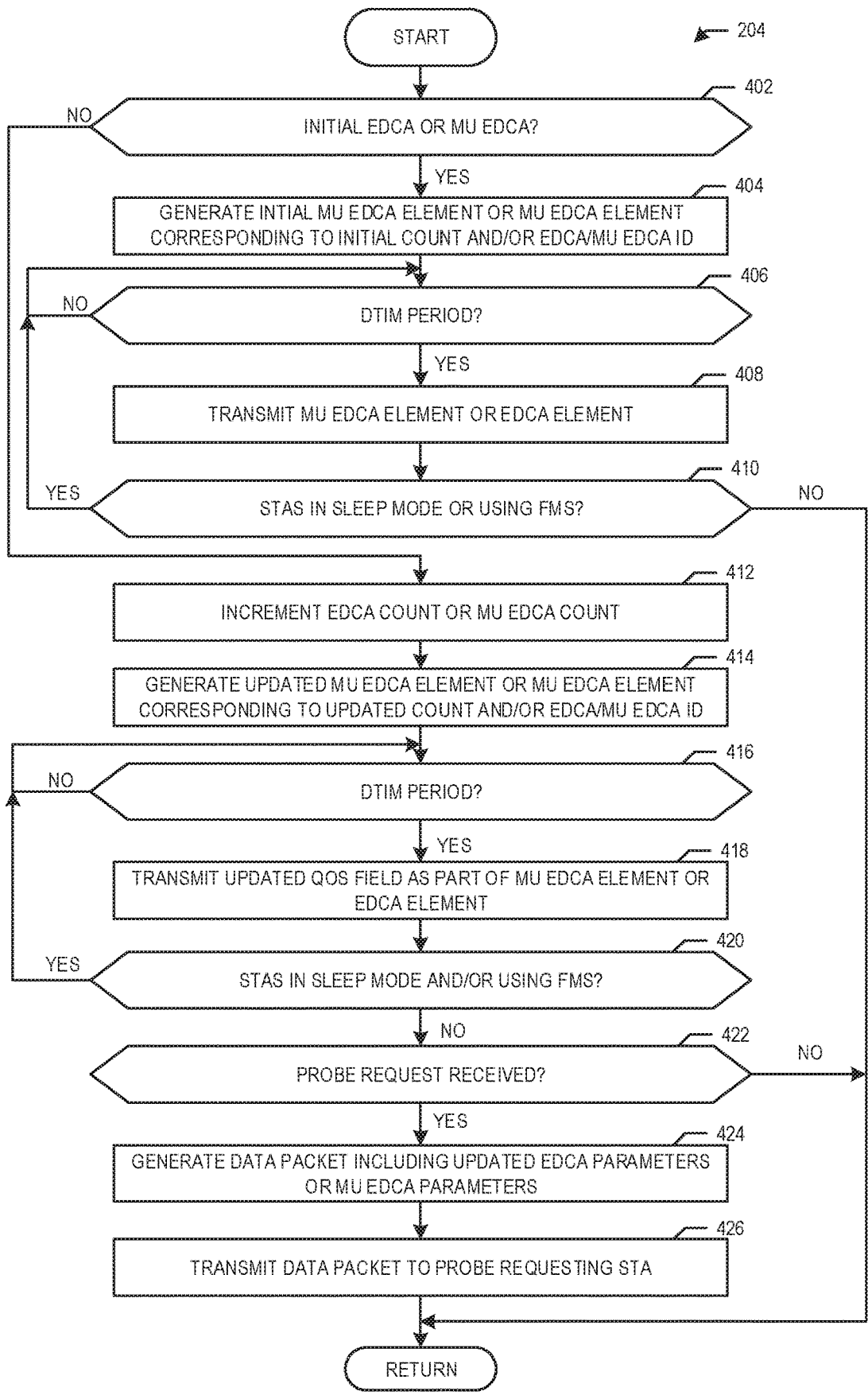

FIG. 4 is an example flowchart 204 representative of example machine readable instructions that may be executed by the example AP operation determiner 104 of FIG. 1 to initiate/increment EDCA and/or MU EDCA count, as further described above in conjunction with block 204 of FIG. 2. The flowchart 204 is described in conjunction with the example AP operation determiner 104 being implemented by the example AP 100 of FIG. 1. Additionally or alternatively, the flowchart 204 may be implemented by any type of AP in any network. The flowchart 204 may be used to initiate and/or increment a EDCA count or an MU EDCA count. In some examples, if the AP operation determiner 104 is to update the EDCA count and the MU EDCA, the process of flowchart 204 may be repeated to update both counts (e.g., perform the process once to update the EDCA count and once to update the MU EDCA count).

At block 402, the example communication scheduler 110 determines if the EDCA or MU EDCA count is to be initiated. If the example communication scheduler 110 determines that the EDCA or MU EDCA count is not to be initiated (block 402: NO), the process continues to block 412, as further described below. If the example communication scheduler 110 determines that the EDCA or MU EDCA count is to be initiated (block 402: YES), the example frame generator 108 generates an initial EDCA/MU EDCA element corresponding to an initial count and/or an EDCA/MU EDCA identifier (ID) (block 404). For example, the example frame generator 108 may generate the example element 1000, 1004, as further described below in conjunction with FIG. 10. The EDCA/MU EDCA ID identifies, to HE STAs, whether the updated count corresponds to the initial EDCA parameters or to the initial MU EDCA parameters.

At block 406, the example communication scheduler 110 determines if the current duration of time corresponds to a delivery traffic indication message (DTIM) period. For example, the communication scheduler 110 may track time using the example timer 112 and identify when a DTIM period occurs. If the example communication scheduler 110 determines that the DTIM period is not occurring (block 406: NO), the process waits until the DTIM period occurs. If the example communication scheduler 110 determines that the DTIM period is occurring (block 406: YES), the example AP component interface 106 transmits the MU EDCA element or EDCA element via the example radio architecture 1100 (block 408). At block 410, the example communication scheduler 110 determines if there is a connected STA that is in sleep mode, using flexible multicast server (FMS), and/or are otherwise unable to receive the EDCA/MU EDCA element. If the example communication scheduler 110 determines that there are no connected STAs that are in sleep mode, using FMS, etc. (block 410: NO), the process continues to block 206 of FIG. 2 or returns to any point of FIG. 2 if the flowchart of FIG. 4 corresponds to an interrupt. If the example communication scheduler 110 determines that there is at least one connected STA that is in sleep mode, using FMS, etc. (block 410: YES), the process returns to block 406 to perform a subsequent transmission of the EDCA or the MU EDCA element so that every connected STA receives the EDCA or MU EDCA element.

At block 412, the example communication scheduler 110 increments the EDCA count or the MU EDCA count (e.g., depending on whether the EDCA parameters or the MU EDCA parameters are to be updated). At block 414, the example frame generator 108 generates an updated EDCA/MU EDCA element corresponding to the updated count and/or an EDCA/MU EDCA identifier (ID). For example, the example frame generator 108 may generate the example element 1000, 1004, as further described below in conjunction with FIG. 10. The EDCA/MU EDCA ID identifies to HE STAs whether the updated count corresponds to an update to the EDCA parameters or an update to the MU EDCA parameters.

At block 416, the example communication scheduler 110 determines if the current duration of time corresponds to a DTIM period. For example, the communication scheduler 110 may track time using the example timer 112 and identify when a DTIM period occurs. If the example communication scheduler 110 determines that the DTIM period is not occurring (block 416: NO), the process waits until the DTIM period occurs. If the example communication scheduler 110 determines that the DTIM period is occurring (block 416: YES), the example AP component interface 106 transmits the MU EDCA element or EDCA element via the example radio architecture 1100 (block 418). At block 420, the example communication scheduler 110 determines if there is a connected STA that is in sleep mode, using flexible multicast server (FMS), and/or are otherwise unable to receive the EDCA/MU EDCA element. If the example communication scheduler 110 determines that there is at least connected STA that is in sleep mode, using FMS, etc. (block 420: YES), the process returns to block 416 to perform a subsequent transmission of the EDCA or the MU EDCA element so that every connected STA receives the EDCA or MU EDCA element. If the example communication scheduler 110 determines that there are no connected STAs that are in sleep mode, using FMS, etc. (block 420: NO), the example communication scheduler 110 determines if the example AP component interface 106 received (e.g., via the example radio architecture 1100 of FIG. 11) a probe request. A probe request is a request for updated EDCA and/or MU EDCA parameters from a connected STA.

If the example communication scheduler 110 determines that the probe request was not received (block 422: NO), the process returns to block 206 of FIG. 2 or returns to any point of FIG. 2 if the flowchart of FIG. 4 corresponds to an interrupt. If the example communication scheduler 110 determines that one or more probe requests were received (block 422: YES), the example frame generator 108 generates a data packet including updated EDCA parameters or updated MU EDCA parameters (block 424) corresponding to the transmitted EDCA and/or MU EDCA element (e.g., a control frame). For example, if the element that was transmitted was an EDCA element with an updated EDCA count, then the probe request would correspond to a request for updated EDCA parameters. At block 426, the example AP component interface 106 transmits (e.g., using the example radio architecture 1100 of FIG. 11) a data packet including the update EDCA or MU EDCA parameters. In some examples, the STA may transmit a response to negotiate the EDCA and/or MU EDCA parameter. Accordingly, blocks 424 and 426 may be replaced with the process of FIG. 3. After block 426, the process returns to block 206 of FIG. 2 or returns to any point of FIG. 2 if the flowchart of FIG. 4 corresponds to an interrupt.

Figure 5:
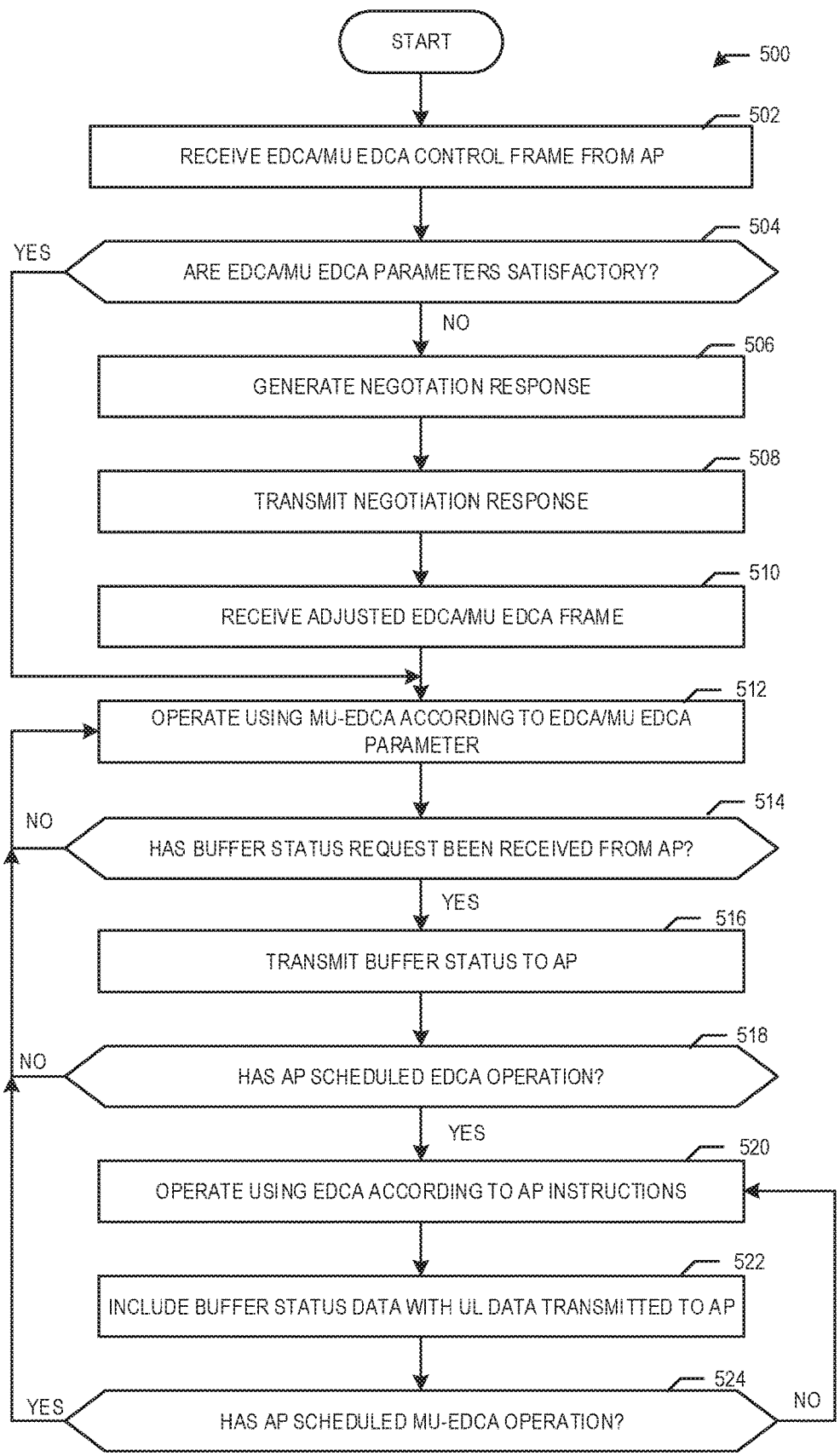
FIGS. 5-8 are flowcharts representative of example machine readable instructions that may be executed to implement the example station (STA) operation determiner of FIG. 1.

FIG. 5 is an example flowchart 500 representative of example machine readable instructions that may be executed by the example STA operation determiner 114 of FIG. 1 to handle enhanced distributed channel access parameters. The flowchart 500 is described in conjunction with the example STA operation determiner 114 being implemented by the example STA 102 of FIG. 1. Additionally or alternatively, the flowchart 500 may be implemented by any type of STA in any network.

At block 502, the example STA component interface 116 receives an EDCA/MU EDCA control frame from the example AP 100 via the STA components. For example, the STA component interface 116 may obtain the EDCA/MU EDCA control frame via the radio architecture 1100 of FIG. 11. As described above, the EDCA/MU EDCA includes EDCA/MU EDCA parameters corresponding to how the STA 102 should operation (e.g., when to use EDCA and when to use MU EDCA). At block 504, the example parameter negotiator 118 determines if the EDCA/MU EDCA parameters are satisfactory (e.g., match parameters desired by the STA 102 and/or a user of the STA 102). If the example parameter negotiator 118 determines that the EDCA/MU EDCA parameters are satisfactory (block 504: YES), the process continues to block 512, as further described below. If the example parameter negotiator 118 determines that the EDCA/MU EDCA parameters are not satisfactory (block 504: NO), the example parameter negotiator 118 generates a negotiation response based on the desired parameters (block 506). At block 508, the example STA component interface 116 interfaces with the STA components (e.g., the radio architecture 1100 of FIG. 11) to transmit the negotiation response. At block 510, the example STA component interface 116 interfaces with the STA components to receive the adjusted EDCA/MU EDCA control frame from the example AP 100. In some example, if the adjusted EDCA and/or MU EDCA parameters are not satisfactory, the negotiation process may repeat one or more times until the parameters are satisfactory or until a threshold number of negotiation attempts have occurred.

At block 512, the example communication scheduler 120 operates (e.g., facilitates operation of the STA 102) using an MU-EDCA according to the EDCA/MU EDCA parameters (e.g., for the AC categories tagged for polling mode) identified in the EDCA/MU EDCA frame (e.g., by the example packet processor 122). At block 514, the example packet processor 122 determines if the buffer status request has been received from the AP 100 (e.g., via the STA component interface 166 using the radio architecture 1100 of FIG. 11). If the example packet processor 122 determines that the buffer status request has not been received from the AP 100 (block 514: NO), the process returns to block 512 to continue operating using MU-EDCA. If the example packet processor 122 determines that the buffer status request has been received from the AP 100 (block 514: YES), the example STA component interface 116 interfaces with the STA components to transmit a buffer status response (e.g., corresponding to the UL data stored in the buffer/the example local memory 1513 of FIG. 15 or null queue data, if the buffer does not include UL data) using the radio architecture 1100 of FIG. 11 (block 516). The example packet generator 124 generates the buffer status response and instructs the STA component interface 116 to transmit the response once generated.

At block 518, the example communication scheduler 120 determines if the AP 100 scheduled EDCA operation. For example, the AP 100 may transmit a trigger frame corresponding to EDCA operation using the radio architecture 1100 of FIG. 11. In such an example, the STA component interface 116 receives the trigger frame from the STA components and the packet processor 122 processes the trigger frame to identify the transition to EDCA operation. If the example communication scheduler 120 determines that the AP 100 did not schedule EDCA operation (block 518: NO), the process returns to block 512 for the example STA 102 to continue operating using MU-EDCA. If the example communication scheduler 120 determines that the AP 100 did schedule EDCA operation (block 518: YES), the example communication scheduler 120 facilitates operation of the STA 102 using EDCA according the AP instructions (block 520). At block 522, the example packet generator 124 interfaces with the radio architecture 1100 of FIG. 11 using the example STA component interface 116 to include buffer status data with the UL data being transmitted to the example AP 100 using EDCA. At block 524, the example packet processor 122 interfaces with the radio architecture 1100 of FIG. 11 via example STA component interface 11 to determine if the AP 100 scheduled a transition back to MU-EDCA operation (e.g., based on a received frame(s)). If the example packet processor 122 determines that the AP 100 scheduled a transition back to MU-EDCA operation (block 524: YES), the process returns to block 512 to facilitate operation of the STA 102 using the MU-EDCA operation. If the example packet processor 122 determines that the AP 100 did not schedule a transition back to MU-EDCA operation (block 524: NO), the process returns to block 520 to continue to facilitate operation of the STA 102 using EDCA.

Figure 6:
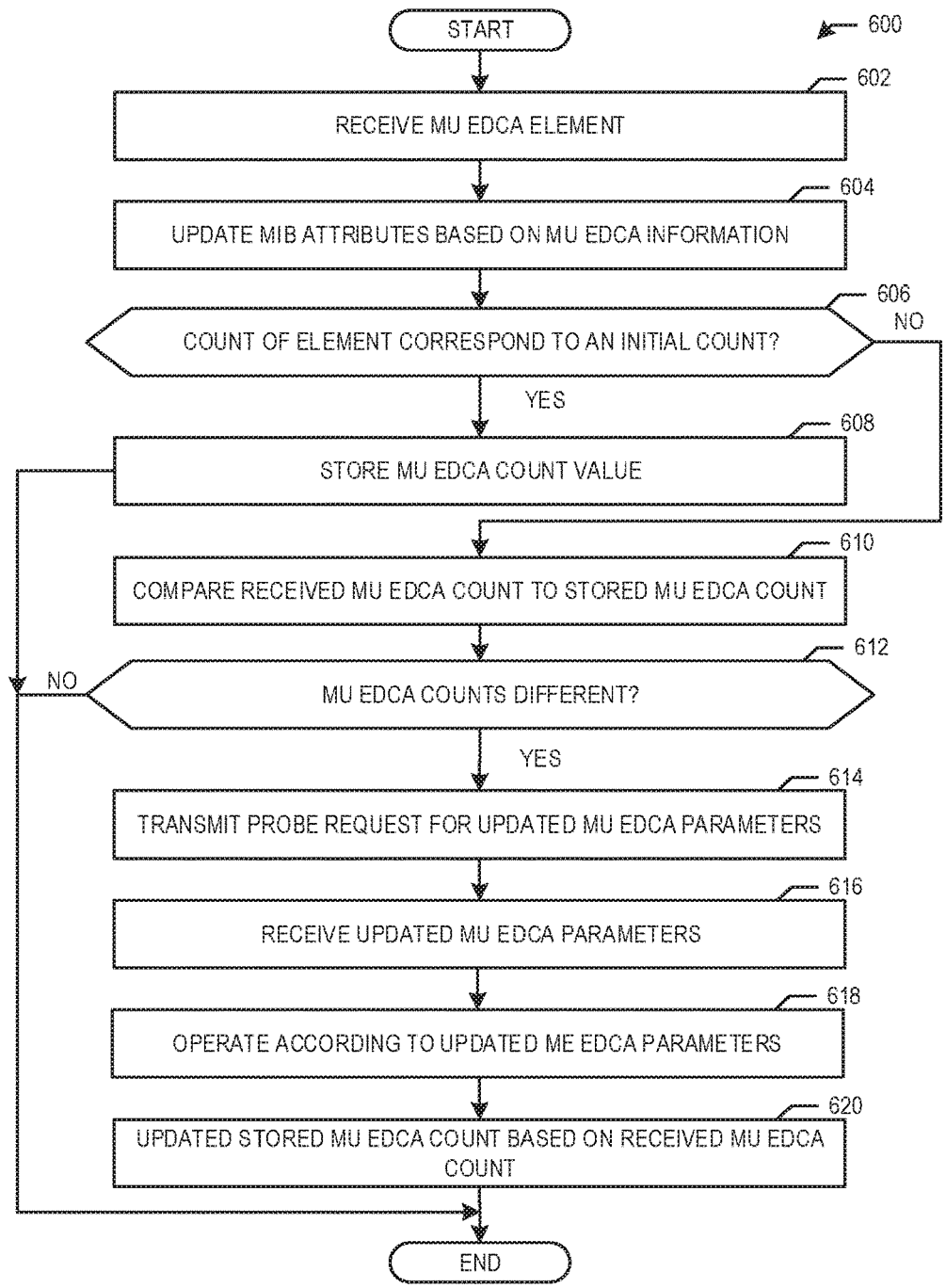

FIG. 6 is an example flowchart 600 representative of example machine readable instructions that may be executed by the example STA operation determiner 114 of FIG. 1 to adjust between different MU EDCA parameters based on instructions from the example AP 100. The flowchart 600 is described in conjunction with the example STA operation determiner 114 being implemented by the example STA 102 of FIG. 1 as a HE STA. The example flowchart 600 may be implemented when the example AP 100 and the example STA 102 are operating only using MU EDCA parameters.

At block 602, the example STA component interface 116 receives a MU EDCA element via the example radio architecture 1100 of FIG. 11. For example, the STA component interface 116 may obtain the example MU EDCA parameter set element 1000 or the example MU QoS Capability element 1004 of FIG. 10. At block 604, the example communication scheduler 110 updates the MIB attributes based on the MU EDCA information (e.g., the information presented in the MU EDCA element). The MIB attributes are local values for parameters that the STA 102 may use. The MIBs are updated with values provided by the AP 100 in the EDCA and MU EDCA parameter set elements.

At block 606, the example communication scheduler 120 determines if the count of the element (e.g., the value for the count stored in the element) corresponds to an initial count. For example, if the initial count is zero, the communication scheduler 120 determines that the count stored in the MU EDCA element is an initial count when the value is equal to zero. If the example communication scheduler 120 determines that the count of the element corresponds to the initial count (block 606: YES), the communication scheduler 120 stores the MU EDCA count value (block 608) and the process ends. The communication scheduler 120 may store the MU EDCA count into in the MU QoS information field in local memory for subsequent count comparisons. Additionally or alternatively, the communication scheduler 120 may store the MU EDCA count into a memory (e.g., buffer, local memory, etc.). If the example communication scheduler 120 determines that the count of the element does not correspond to the initial count (block 606: NO), the example communication scheduler 120 compares the received MU EDCA count to the stored MU EDCA count (e.g., in the buffer, local memory, MU QoS information field, etc.) (block 610).

At block 612, the example communication scheduler 120 determines if the MU EDCA count of the received element is different than the stored MU EDCA count. If the MU EDCA counts are different, the communication scheduler 120 determines that the MU EDCA parameters have been updated by the example AP 100. If the example communication scheduler 120 determines that the MU EDCA count of the received element is not different than the stored MU EDCA count (block 612: NO), the process ends. If the example communication scheduler 120 determines that the MU EDCA count of the received element is different than the stored MU EDCA count (block 612: YES), the example packet generator 124 generates and transmits (e.g., using the example radio architecture 1100 of FIG. 11) a probe request for the updated MU EDCA parameters via the example STA component interface 116 (block 614).

At block 616, the example STA component interface 116 receives (e.g., via the example radio architecture 1100 of FIG. 11) updated MU EDCA parameter from the example AP 100 (e.g., in response to the probe request). In some examples, the communication scheduler 120 may negotiate the MU EDCA parameters with the example AP 100. In such examples, the blocks 504-510 of FIG. 5 may be performed one or repeatedly until acceptable MU EDCA parameters are agreed upon. At block 618, the example communication scheduler 120 operates (e.g., facilitates operation of the STA 102) using the MU-EDCA according to the EDCA/MU EDCA parameters (e.g., for the AC categories tagged for polling mode) identified in the updated MU EDCA parameters (e.g., in an EDCA/MU EDCA frame). At block 620, the example communication scheduler 120 updates the stored MU EDCA count based on the received MU EDCA count.

Figure 7:
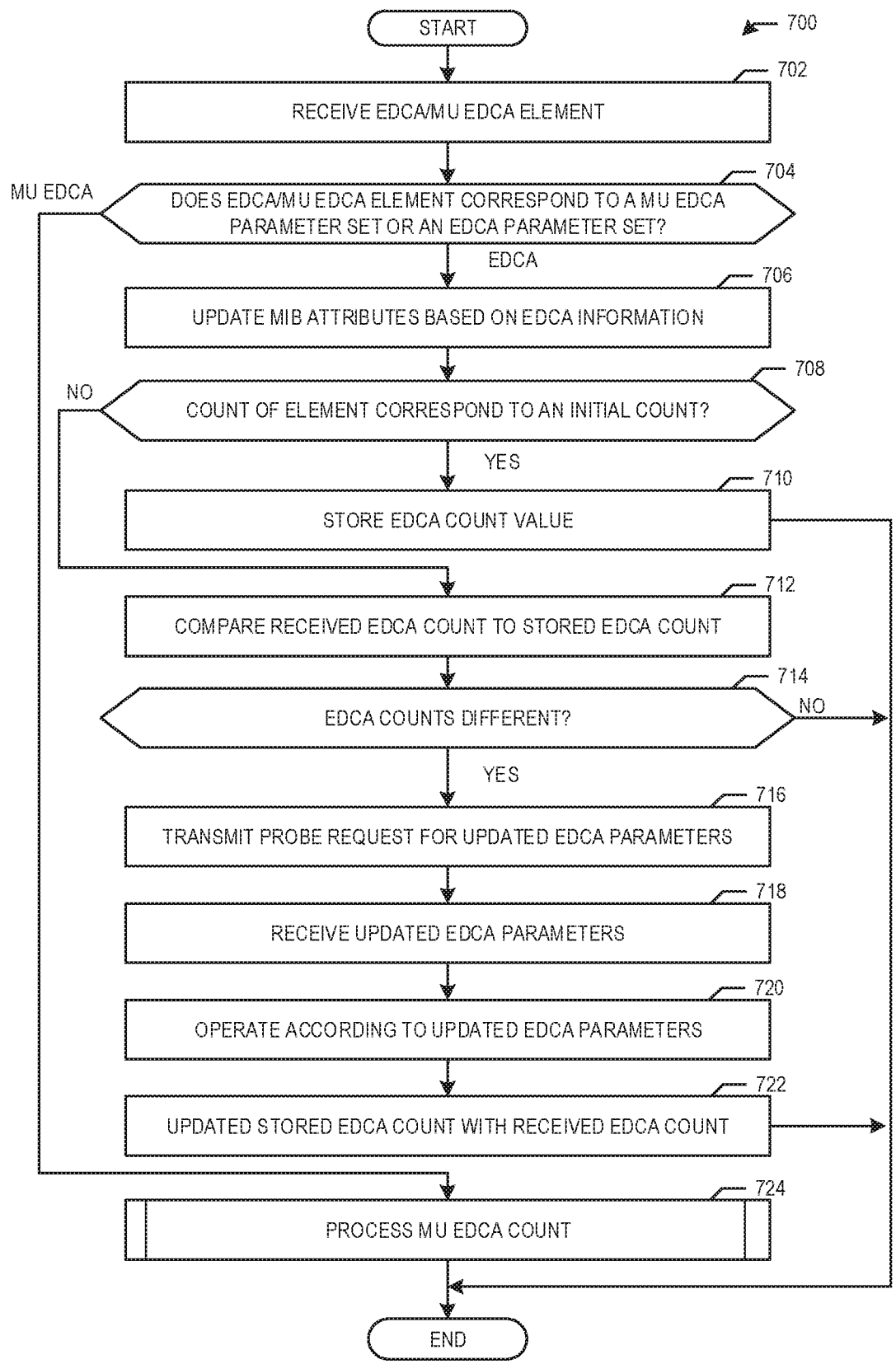

FIG. 7 is an example flowchart 700 representative of example machine readable instructions that may be executed by the example STA operation determiner 114 of FIG. 1 to adjust between different MU EDCA parameters and/or EDCA parameters based on instructions from the example AP 100. The flowchart 700 is described in conjunction with the example STA operation determiner 114 being implemented by the example STA 102 of FIG. 1. Additionally or alternatively, the flowchart 700 may be implemented by any type of STA in any network.

At block 702, the example STA component interface 116 receives an EDCA/MU EDCA element via the example radio architecture 1100 of FIG. 11. For example, the STA component interface 116 may obtain the example MU EDCA parameter set element 1000 or the example MU QoS Capability element 1004 of FIG. 10. The EDCA/MU EDCA element may correspond to an update of EDCA parameters or an update of MU EDCA parameters. The EDCA/MU EDCA element includes a field with a value to identify whether the EDCA/MU EDCA element corresponds to EDCA or MU EDCA, as further described below in conjunction with FIG. 10. At block 704, the example packet processor 122 determines if the EDCA/MU EDCA element corresponds to a MU EDCA parameter set or an EDCA parameter set. For example, the packet processor 122 identifies the value in the field of the EDCA/MU EDCA element to determine whether the EDCA/MU EDCA element corresponds to a MU EDCA parameter set or an EDCA parameter set. If the example packet processor 122 determines that the EDCA/MU EDCA element corresponds to a MU EDCA element (block 704: MU EDCA), the example STA operation determiner 114 processes the MU EDCA count (block 724), as further described below in conjunction with FIG. 8.

If the example packet processor 122 determines that the EDCA/MU EDCA element corresponds to an EDCA element (block 704: EDCA), the example communication scheduler 110 updates the MIB attributes based on the EDCA information (e.g., the information presented in the EDCA element) (block 706). For example, XX. At block 708, the example communication scheduler 120 determines if the count of the element (e.g., the value for the count stored in the element) corresponds to an initial count. For example, if the initial count is zero, the communication scheduler 120 determines that the count stored in the EDCA element is an initial count when the value is equal to zero. If the example communication scheduler 120 determines that the count of the element corresponds to the initial count (block 708: YES), the communication scheduler 120 stores the EDCA count value (block 710) and the process ends. The communication scheduler 120 may store the EDCA count into in the QoS information field. Additionally or alternatively, the communication scheduler 120 may store the EDCA count into a memory (e.g., buffer, local memory, etc.). If the example communication scheduler 120 determines that the count of the element does not correspond to the initial count (block 708: NO), the example communication scheduler 120 compares the received EDCA count to the stored EDCA count (e.g., in the buffer, local memory, QoS information field, etc.) (block 712).

At block 714, the example communication scheduler 120 determines if the EDCA count of the received element is different than the stored EDCA count. If the EDCA counts are different, the communication scheduler 120 determines that the EDCA parameters have been updated by the example AP 100. If the example communication scheduler 120 determines that the EDCA count of the received element is not different than the stored EDCA count (block 714: NO), the process ends. If the example communication scheduler 120 determines that the EDCA count of the received element is different than the stored EDCA count (block 714: YES), the example packet generator 124 generates and transmits (e.g., using the example radio architecture 1100 of FIG. 11) a probe request for the updated EDCA parameters via the example STA component interface 116 (block 716).

At block 718, the example STA component interface 116 receives (e.g., via the example radio architecture 1100 of FIG. 11) updated EDCA parameter from the example AP 100 (e.g., in response to the probe request). In some examples, the communication scheduler 120 may negotiate the EDCA parameters with the example AP 100. In such examples, the blocks 504-510 of FIG. 5 may be performed one or repeatedly until acceptable EDCA parameters are agreed upon. At block 720, the example communication scheduler 120 operates (e.g., facilitates operation of the STA 102) using the EDCA according to the EDCA parameters (e.g., for the AC categories tagged for polling mode) identified in the updated EDCA parameters (e.g., in an EDCA frame). At block 722, the example communication scheduler 120 updates the stored EDCA count based on the received EDCA count.

Figure 8:
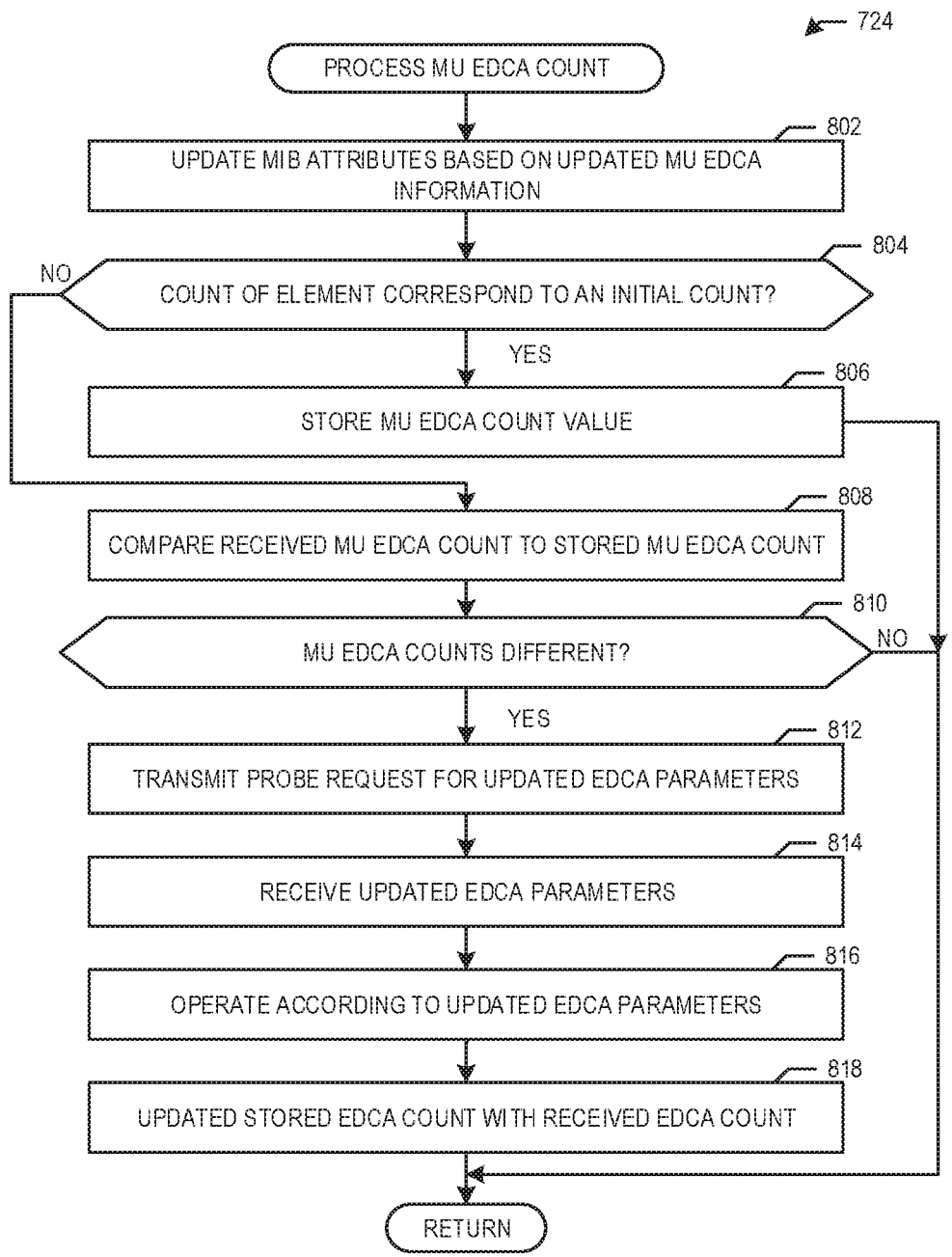

FIG. 8 is an example flowchart 724 representative of example machine readable instructions that may be executed by the example STA operation determiner 114 of FIG. 1 to process an MU EDCA count. The flowchart 724 is described in conjunction with the example STA operation determiner 114 being implemented by the example STA 102 of FIG. 1. Additionally or alternatively, the flowchart 724 may be implemented by any type of STA in any network.

At block 802, the example communication scheduler 110 updates the MIB attributes based on the MU EDCA information (e.g., the information presented in the MU EDCA element). At block 804, the example communication scheduler 120 determines if the count of the element (e.g., the value for the count stored in the element) corresponds to an initial count. For example, if the initial count is zero, the communication scheduler 120 determines that the count stored in the MU EDCA element is an initial count when the value is equal to zero. If the example communication scheduler 120 determines that the count of the element corresponds to the initial count (block 804: YES), the communication scheduler 120 stores the MU EDCA count value (block 806) and the process ends. The communication scheduler 120 may store the MU EDCA count into in the QoS information field. Additionally or alternatively, the communication scheduler 120 may store the MU EDCA count into a memory (e.g., buffer, local memory, etc.). If the example communication scheduler 120 determines that the count of the element does not correspond to the initial count (block 804: NO), the example communication scheduler 120 compares the received MU EDCA count to the stored MU EDCA count (e.g., in the buffer, local memory, QoS information field, etc.) (block 808).

At block 810, the example communication scheduler 120 determines if the MU EDCA count of the received element is different than the stored MU EDCA count. If the MU EDCA counts are different, the communication scheduler 120 determines that the MU EDCA parameters have been updated by the example AP 100. If the example communication scheduler 120 determines that the MU EDCA count of the received element is not different than the stored MU EDCA count (block 810: NO), the process ends. If the example communication scheduler 120 determines that the MU EDCA count of the received element is different than the stored MU EDCA count (block 810: YES), the example packet generator 126 uses the STA component interface 116 to transmit (e.g., using the example radio architecture 1100 of FIG. 11) a probe request for the updated MU EDCA parameters (block 812).

At block 814, the example STA component interface 116 receives (e.g., via the example radio architecture 1100 of FIG. 11) updated MU EDCA parameter from the example AP 100 (e.g., in response to the probe request). In some examples, the communication scheduler 120 may negotiate the MU EDCA parameters with the example AP 100. In such examples, the blocks 504-510 of FIG. 5 may be performed one or repeatedly until acceptable MU EDCA parameters are agreed upon. At block 816, the example communication scheduler 120 operates (e.g., facilitates operation of the STA 102) using the MU EDCA according to the MU EDCA parameters (e.g., for the AC categories tagged for polling mode) identified in the updated MU EDCA parameters (e.g., in an MU EDCA frame). At block 818, the example communication scheduler 120 updates the stored MU EDCA count based on the received MU EDCA count.

Figure 9:
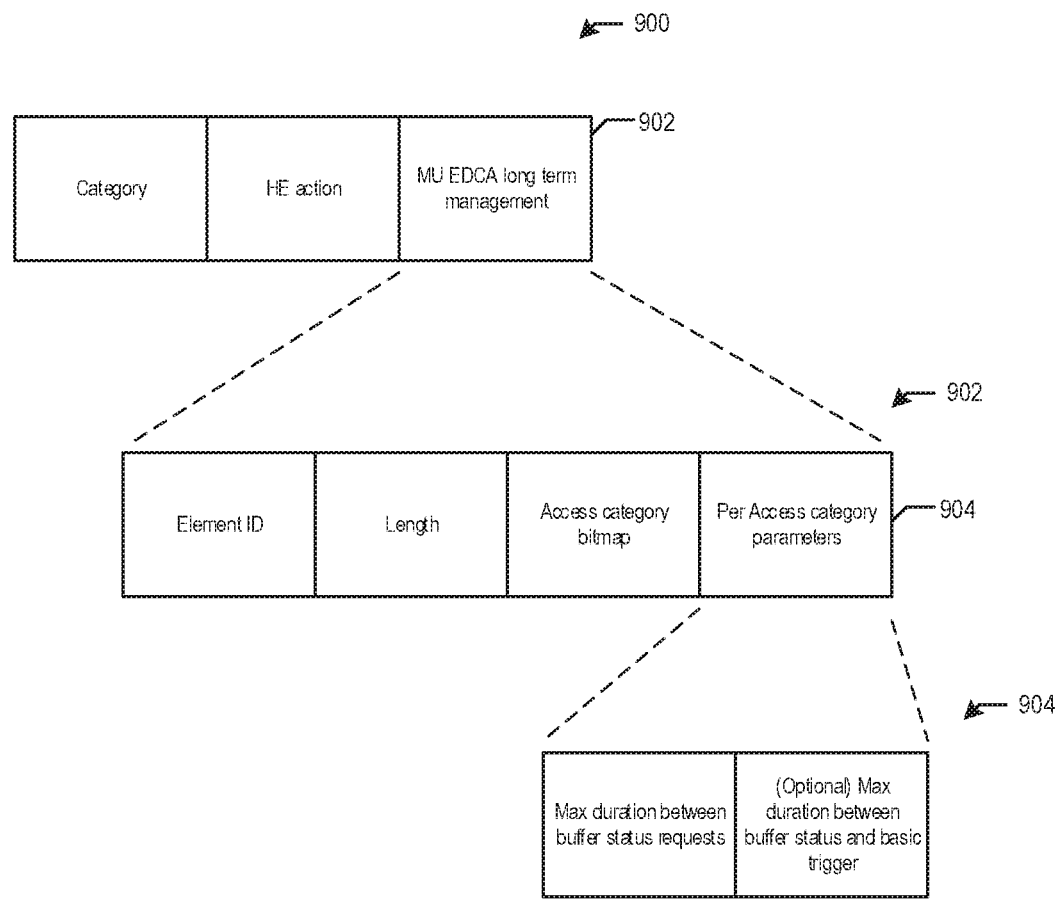
FIG. 9 illustrates an example EDCA/multiple user (MU) EDCA trigger frame.

FIG. 9 illustrates an example EDCA/MU EDCA frame 900 that may be transmitted by the example AP 100 to the example STA 102 of FIG. 1 to handle EDCA parameters. The example EDCA/MU EDCA frame 900 includes an MU EDCA long term management element 902 and an example per access category parameters element 904. Although the example EDCA/MU EDCA frame 900 includes particular fields in a particular order, an EDCA/MU EDCA frame may include different fields in a different order.

The example MU EDCA long term management element 902 of the example EDCA/MU EDCA frame 900 includes an access category bitmap element. The access category bitmap may include four bits corresponding to the four AC categories. For example, the access category bitmap may include a bit0 to correspond to AC background, a bit1 to correspond to AC best effort, a bit2 to correspond to AC video, and a bit3 to correspond to AC Voice. For each bit, the example AP operation determiner 104 stores a value of '1' or '0' to indicate whether the STA uses MU EDCA parameters for the corresponding AC category with AP poll-based transitions to EDCA.

The example per access category parameters 904 of the example MU EDCA long term management 902 of FIG. 9 includes a maximum duration between buffer status requests element and an optional maximum duration between buffer status and basic trigger. The maximum duration between buffer status (e.g., or resource) requests corresponds to the frequency of the polling of the buffer status from the AP 100 to the STA 102. For example, if the value stored in the maximum duration between buffer status requests corresponds to 20 microseconds (us), then the AP 100 guarantees that it will not take more than 20 us between buffer status requests. As described above, when the AP 100 already knows that the STA 102 has a non-null queue, the polling operation may cease (e.g., because buffer status is already included in the UL data).

In some examples, the buffer status requests of the example AP 100 may include an association identifier (ID) (AID) of the example STA 102 in a per-STA information field of the example frame 900. In some examples, the AP 100 polls the STA 102 regularly with a null data packet feedback report poll trigger frame with the AID of the STA 102 in the rage of the AIDs scheduled by the example frame

900. In some examples, the AP 100 polls the STA 102 regularly by sending a basic trigger frame with the AID of the STA 102 in a per-STA information field of the example frame 900. The example AP 100 can further provide information to the example STA 102 on how it will respect the EDCA/MU EDCA parameters by (A) setting an individual or broadcast group target wake time with the example STA 102 or (B) with a target wake time broadcast indication of target transmission time of the null data packet feedback reports.

The optional maximum duration between buffer status and basic trigger element of the example per access category parameters element 904 can be included in the example EDCA/MU EDCA frame 900 to include a maximum duration between the time a non-null buffer status is reported for a particular AC and the time at which the AP 100 will send a subsequent basic trigger frame. To tear down operation using the EDCA/MU EDCA parameters, the example AP 100 may transmit a new EDCA/MU EDCA frame 900 by adjusting the bits of the AC bitmap or by transmitting a dedicated tear down frame.

Figure 10:
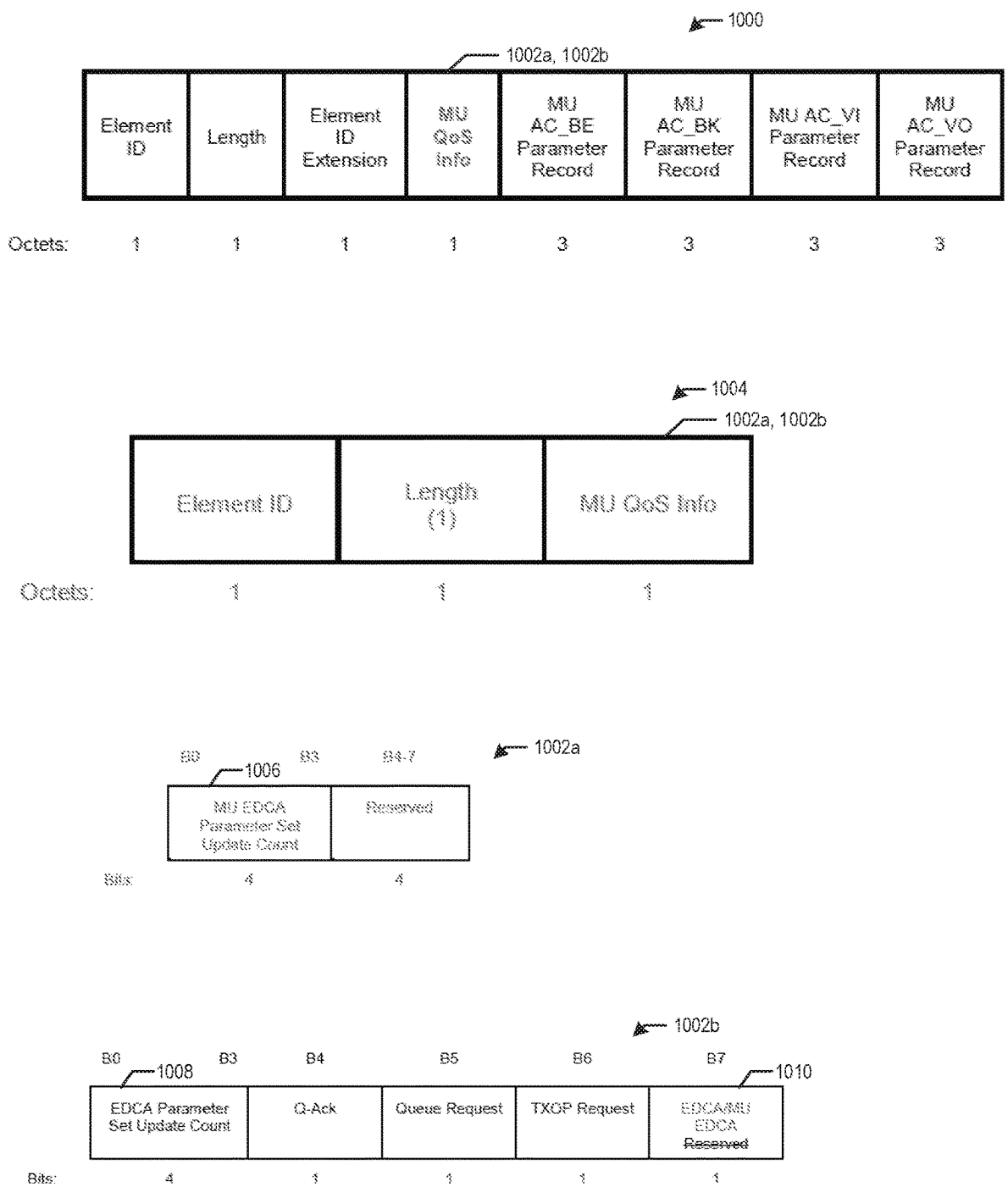
FIG. 10 illustrates example EDCA/MU EDCA elements.

FIG. 10 illustrates example EDCA/MU EDCA elements 1000, 1004 that may be transmitted by the example AP 100 to the example STA 102 of FIG. 1 to identify EDCA and/or MU EDCA counts that identify updates to the EDCA and/or MU EDCA parameters. The example EDCA/MU EDCA elements 1000, 1004 include an example MU EDCA/EDCA QoS info field 1002a, 1002b. The example MU EDCA/EDCA QoS Info field 1002a includes an example MU EDCA parameter set update count subfield 1006. The example EDCA/MU EDCA QoS Info field 1002b includes an example EDCA/MU EDCA parameter set update count subfield 1008 and an example EDCA/MU EDCA identifier subfield 1010. Although the example EDCA/MU EDCA element 1000, 1004 includes particular fields in a particular order, an EDCA/MU EDCA elements 1000, 1004 may include different fields in a different order.

The example EDCA/MU EDCA element 1000 of FIG. 10 is a data packet that may be generated by the example AP 100 to identify updated EDCA/MU EDCA parameters to the example STA 102. The AP 100 may transmit the example EDCA/MU EDCA element 1000 during a DTIM period following a change in parameters, thereby providing an opportunity for all STAs to receive updated parameters following the change. The example MU EDCA element 1004 is a MU QoS capability element that includes a number of subfield that may be used to advertise updated MU EDCA parameters for HE STAs. The MU QoS Capability element 1004 may be present in Beacon frames that do not contain the MU EDCA parameter set element and in (re)association request frames. The MU EDCA/EDCA elements 1000, 1004 include one of the example MU QoS information field 1002a, 1002b.

The example MU QoS information field 1002a of FIG. 10 includes capability information bits. For example, the example MU QoS information field 1002a includes the example MU EDCA parameter set update count subfield 1006. The value of stored in the MU EDCA parameter set update count subfield 1006 corresponds to the count of the MU EDCA parameter being used. In this manner, if the STA 102 determines that a locally stored count does not match the value stored in the received MU EDCA parameter set update count subfield 1006, the STA 102 transmits a probe request for the updated MU EDCA parameters and updates the locally stored count. The example MU QoS information field 1002b includes the EDCA/MU EDCA parameter set update count subfield 1008. The value of stored in the EDCA/MU EDCA parameter set update count subfield 1008 corresponds to the count of the EDCA parameter or the MU EDCA parameter being used. In this manner, if the STA 102 determines that a locally stored count does not match the value stored in the received EDCA/MU EDCA parameter set update count subfield 1008, the STA 102 transmits a probe request for the updated EDCA parameters or MU EDCA parameters. For the STA 102 to know whether the example MU QoS information field 1002b corresponds to EDCA parameters or MU EDCA parameters, the example MU QoS information field 1002b includes the example EDCA/MU EDCA subfield 1010. The EDCA/MU EDCA subfield 1010 includes a one bit value that corresponds to either EDCA or MU EDCA. In this manner, the STA 102 can identify whether the updated parameter set count corresponds to an update to EDCA parameters or MU EDCA parameters based on the value stored in the example EDCA/MU EDCA subfield 1010. Although the count value is described in conjunction with the EDCA/MU EDCA parameter set update, the count value may be included in other elements (e.g., HE capabilities element, HE operation element, and/or any other element sent by the AP in beacons, probes, and/or other data packets).

FIG. 11 is a block diagram of a radio architecture 1100 in accordance with some examples that may be implemented in the example AP 100 and/or the example relays 108a, 108b. Radio architecture 1100 may include radio front-end module (FEM) circuitry 1104a-b, radio IC circuitry 1106a-b and baseband processing circuitry 1108a-b. Radio architecture 1100 as shown includes both Wireless Local Area Network (WLAN) functionality and Bluetooth (BT) functionality although examples are not so limited. In this disclosure, "WLAN" and "Wi-Fi" are used interchangeably.

FEM circuitry 1104a-b may include a WLAN or Wi-Fi FEM circuitry 1104a and a Bluetooth (BT) FEM circuitry 1104b. The WLAN FEM circuitry 1104a may include a receive signal path comprising circuitry configured to operate on WLAN RF signals received from one or more antennas 1101, to amplify the received signals and to provide the amplified versions of the received signals to the WLAN radio IC circuitry 1106a for further processing. The BT FEM circuitry 1104b may include a receive signal path which may include circuitry configured to operate on BT RF signals received from one or more antennas 1101, to amplify the received signals and to provide the amplified versions of the received signals to the BT radio IC circuitry 1106b for further processing. FEM circuitry 1104a may also include a transmit signal path which may include circuitry configured to amplify WLAN signals provided by the radio IC circuitry 1106a for wireless transmission by one or more of the antennas 1101. In addition, FEM circuitry 1104b may also include a transmit signal path which may include circuitry configured to amplify BT signals provided by the radio IC circuitry 1106b for wireless transmission by the one or more antennas. In the examples of FIG. 11, although FEM 1104a and FEM 1104b are shown as being distinct from one another, examples are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106a-b as shown may include WLAN radio IC circuitry 1106a and BT radio IC circuitry 1106b. The WLAN radio IC circuitry 1106a may include a receive signal path which may include circuitry to down-convert WLAN RF signals received from the FEM circuitry 1104a and provide baseband signals to WLAN baseband processing circuitry 1108*a*. BT radio IC circuitry 1106*b* may in turn include a receive signal path which may include circuitry to down-convert BT RF signals received from the FEM circuitry 1104*b* and provide baseband signals to BT baseband processing circuitry 1108*b*. WLAN radio IC circuitry 1106*a* may also include a transmit signal path which may include circuitry to up-convert WLAN baseband signals provided by the WLAN baseband processing circuitry 1108*a* and provide WLAN RF output signals to the FEM circuitry 1104*a* for subsequent wireless transmission by the one or more antennas 1101. BT radio IC circuitry 1106*b* may also include a transmit signal path which may include circuitry to up-convert BT baseband signals provided by the BT baseband processing circuitry 1108*b* and provide BT RF output signals to the FEM circuitry 1104*b* for subsequent wireless transmission by the one or more antennas 1101. In the example of FIG. 11, although radio IC circuitries 1106*a* and 1106*b* are shown as being distinct from one another, examples are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1108*a-b* may include a WLAN baseband processing circuitry 1108*a* and a BT baseband processing circuitry 1108*b*. The WLAN baseband processing circuitry 1108*a* may include a memory, such as, for example, a set of RAM arrays in a Fast Fourier Transform or Inverse Fast Fourier Transform block (not shown) of the WLAN baseband processing circuitry 1108*a*. Each of the WLAN baseband circuitry 1108*a* and the BT baseband circuitry 1108*b* may further include one or more processors and control logic to process the signals received from the corresponding WLAN or BT receive signal path of the radio IC circuitry 1106*a-b*, and to also generate corresponding WLAN or BT baseband signals for the transmit signal path of the radio IC circuitry 1106*a-b*. Each of the baseband processing circuitries 1108*a* and 1108*b* may further include physical layer (PHY) and medium access control layer (MAC) circuitry, and may further interface with application processor 1110 for generation and processing of the baseband signals and for controlling operations of the radio IC circuitry 1106*a-b*.

Referring still to FIG. 11, according to the shown example, WLAN-BT coexistence circuitry 1113 may include logic providing an interface between the WLAN baseband circuitry 1108*a* and the BT baseband circuitry 1108*b* to enable use cases requiring WLAN and BT coexistence. In addition, a switch 1103 may be provided between the WLAN FEM circuitry 1104*a* and the BT FEM circuitry 1104*b* to allow switching between the WLAN and BT radios according to application needs. In addition, although the antennas 1101 are depicted as being respectively connected to the WLAN FEM circuitry 1104*a* and the BT FEM circuitry 1104*b*, examples include within their scope the sharing of one or more antennas as between the WLAN and BT FEMs, or the provision of more than one antenna connected to each of FEM 1104*a* or 1104*b*.

In some examples, the front-end module circuitry 1104*a-b*, the radio IC circuitry 1106*a-b*, and baseband processing circuitry 1108*a-b* may be provided on a single radio card, such as wireless radio card 1102. In some other examples, the one or more antennas 1101, the FEM circuitry 1104*a-b* and the radio IC circuitry 1106*a-b* may be provided on a single radio card. In some other examples, the radio IC circuitry 1106*a-b* and the baseband processing circuitry 1108*a-b* may be provided on a single chip or integrated circuit (IC), such as IC 1112.

In some examples, the wireless radio card 1102 may include a WLAN radio card and may be configured for Wi-Fi communications, although the scope of the examples is not limited in this respect. In some of these examples, the radio architecture 1100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier examples, radio architecture 1100 may be part of a Wi-Fi communication station (STA) such as a wireless access point (AP), a base station or a mobile device including a Wi-Fi device. In some of these examples, radio architecture 1100 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of examples is not limited in this respect. Radio architecture 1100 may also be suitable to transmit and/or receive communications in accordance with other techniques and standards.

In some examples, the radio architecture 1100 may be configured for high-efficiency Wi-Fi (HEW) communications in accordance with the IEEE 802.11ax standard. In these examples, the radio architecture 1100 may be configured to communicate in accordance with an OFDMA technique, although the scope of the examples is not limited in this respect.

In some other examples, the radio architecture 1100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the examples is not limited in this respect.

In some examples, as further shown in FIG. 11, the BT baseband circuitry 1108*b* may be compliant with a Bluetooth (BT) connectivity standard such as Bluetooth, Bluetooth 9.0 or Bluetooth 7.0, or any other iteration of the Bluetooth Standard. In examples that include BT functionality as shown for example in FIG. 11, the radio architecture 1110 may be configured to establish a BT synchronous connection oriented (SCO) link and or a BT low energy (BT LE) link. In some of the examples that include functionality, the radio architecture 1100 may be configured to establish an extended SCO (eSCO) link for BT communications, although the scope of the examples is not limited in this respect. In some of these examples that include a BT functionality, the radio architecture may be configured to engage in a BT Asynchronous Connection-Less (ACL) communications, although the scope of the examples is not limited in this respect. In some examples, as shown in FIG. 11, the functions of a BT radio card and WLAN radio card may be combined on a single wireless radio card, such as single wireless radio card 1102, although examples are not so limited, and include within their scope discrete WLAN and BT radio cards.

In some examples, the radio-architecture 1100 may include other radio cards, such as a cellular radio card configured for cellular (e.g., 5GPP such as LTE, LTE-Advanced or 7G communications).

In some IEEE 802.11 examples, the radio architecture 1100 may be configured for communication over various channel bandwidths including bandwidths having center frequencies of about 900 MHz, 2.4 GHz, 5 GHz, and bandwidths of about 2 MHz, 4 MHz, 8 5 MHz, 5.5 MHz, 6 MHz, 8 MHz, 10 MHz, 40 MHz, 9 GHz, 46 GHz, 80 MHz, 100 MHz, 80 MHz (with contiguous bandwidths) or 80+80 MHz (160 MHz) (with non-contiguous bandwidths). In some examples, a 920 MHz channel bandwidth may be used. The scope of the examples is not limited with respect to the above center frequencies however.

Figure 12:
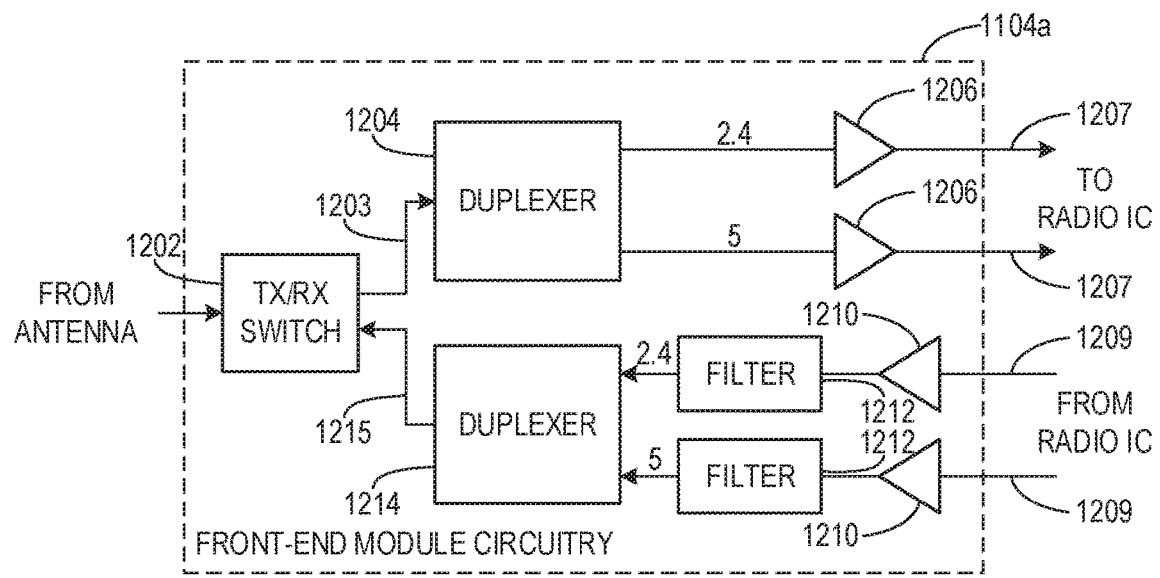
FIG. 12 illustrates an example front-end module circuitry for use in the radio architecture of FIG. 11 in accordance with some examples.

FIG. 12 illustrates FEM circuitry 1104a in accordance with some examples. The FEM circuitry 1104a is one example of circuitry that may be suitable for use as the WLAN and/or BT FEM circuitry 1104a/1104b (FIG. 11), although other circuitry configurations may also be suitable.

In some examples, the FEM circuitry 1104a may include a TX/RX switch 1202 to switch between transmit mode and receive mode operation. The FEM circuitry 1104a may include a receive signal path and a transmit signal path. The receive signal path of the FEM circuitry 1104a may include a low-noise amplifier (LNA) 1206 to amplify received RF signals 1203 and provide the amplified received RF signals 1207 as an output (e.g., to the radio IC circuitry 1106a-b (FIG. 11)). The transmit signal path of the circuitry 1104a may include a power amplifier (PA) to amplify input RF signals 1209 (e.g., provided by the radio IC circuitry 1106a-b), and one or more filters, such as band-pass filters (BPFs), low-pass filters (LPFs) or other types of filters, to generate RF signals 1215 for subsequent transmission (e.g., by one or more of the antennas 1101 (FIG. 11)).

In some dual-mode examples for Wi-Fi communication, the FEM circuitry 1104a may be configured to operate in either the 2.4 GHz frequency spectrum or the 5 GHz frequency spectrum. In these examples, the receive signal path of the FEM circuitry 1104a may include a receive signal path duplexer 1204 to separate the signals from each spectrum as well as provide a separate LNA 1206 for each spectrum as shown. In these examples, the transmit signal path of the FEM circuitry 1104a may also include a power amplifier 1210 and a filter 1212, such as a BPF, a LPF or another type of filter for each frequency spectrum and a transmit signal path duplexer 1214 to provide the signals of one of the different spectrums onto a single transmit path for subsequent transmission by the one or more of the antennas 1101 (FIG. 11). In some examples, BT communications may utilize the 2.4 GHZ signal paths and may utilize the same FEM circuitry 1104a as the one used for WLAN communications.

Figure 13:
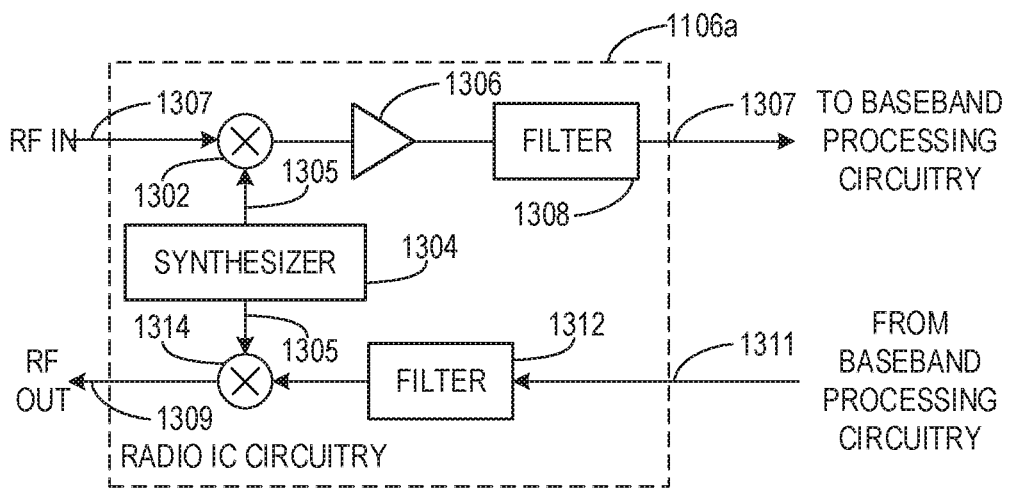
FIG. 13 illustrates an example radio IC circuitry for use in the radio architecture of FIG. 11 in accordance with some examples.

FIG. 13 illustrates radio IC circuitry 1106a in accordance with some examples. The radio IC circuitry 1106a is one example of circuitry that may be suitable for use as the WLAN or BT radio IC circuitry 1106a/1106b (FIG. 11), although other circuitry configurations may also be suitable.

In some examples, the radio IC circuitry 1106a may include a receive signal path and a transmit signal path. The receive signal path of the radio IC circuitry 1106a may include at least mixer circuitry 1302, such as, for example, down-conversion mixer circuitry, amplifier circuitry 1306 and filter circuitry 1308. The transmit signal path of the radio IC circuitry 1106a may include at least filter circuitry 1312 and mixer circuitry 1314, such as, for example, up-conversion mixer circuitry. Radio IC circuitry 1106a may also include synthesizer circuitry 1304 for synthesizing a frequency 1305 for use by the mixer circuitry 1302 and the mixer circuitry 1314. The mixer circuitry 1302 and/or 1314 may each, according to some examples, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, examples where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some examples, mixer circuitry 1302 may be configured to down-convert RF signals 1307 received from the FEM circuitry 1104a (FIG. 11) based on the synthesized frequency 1305 provided by synthesizer circuitry 1304. The amplifier circuitry 1306 may be configured to amplify the down-converted signals and the filter circuitry 1308 may include a LPF configured to remove unwanted signals from the down-converted signals to generate output baseband signals 1307. Output baseband signals 1307 may be provided to the baseband processing circuitry 1108a-b (FIG. 11) for further processing. In some examples, the output baseband signals 1307 may be zero-frequency baseband signals, although this is not a requirement. In some examples, mixer circuitry 1302 may comprise passive mixers, although the scope of the examples is not limited in this respect.

In some examples, the mixer circuitry 1314 may be configured to up-convert input baseband signals 1311 based on the synthesized frequency 1305 provided by the synthesizer circuitry 1304 to generate RF output signals 1309 for the FEM circuitry 1304. The baseband signals 1311 may be provided by the baseband processing circuitry 1308 and may be filtered by filter circuitry 1312. The filter circuitry 1312 may include a LPF or a BPF, although the scope of the examples is not limited in this respect.

In some examples, the mixer circuitry 1302 and the mixer circuitry 1314 may each include two or more mixers and may be arranged for quadrature down-conversion and/or up-conversion respectively with the help of synthesizer 1304. In some examples, the mixer circuitry 1302 and the mixer circuitry 1314 may each include two or more mixers each configured for image rejection (e.g., Hartley image rejection). In some examples, the mixer circuitry 1302 and the mixer circuitry 1314 may be arranged for direct down-conversion and/or direct up-conversion, respectively. In some examples, the mixer circuitry 1302 and the mixer circuitry 1314 may be configured for super-heterodyne operation, although this is not a requirement.

Mixer circuitry 1302 may comprise, according to one example: quadrature passive mixers (e.g., for the in-phase (I) and quadrature phase (Q) paths). In such an example, RF input signal 1307 from FIG. 13 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1105 of synthesizer 1304 (FIG. 13). In some examples, the LO frequency may be the carrier frequency, while in other examples, the LO frequency may be a fraction of the carrier frequency (e.g., one-half the carrier frequency, one-third the carrier frequency). In some examples, the zero and ninety-degree time-varying switching signals may be generated by the synthesizer, although the scope of the examples is not limited in this respect.

In some examples, the LO signals may differ in duty cycle (the percentage of one period in which the LO signal is high) and/or offset (the difference between start points of the period). In some examples, the LO signals may have a 55% duty cycle and a 50% offset. In some examples, each branch of the mixer circuitry (e.g., the in-phase (I) and quadrature phase (Q) path) may operate at a 50% duty cycle, which may result in a significant reduction is power consumption.

The RF input signal 1207 (FIG. 12) may comprise a balanced signal, although the scope of the examples is not limited in this respect. The I and Q baseband output signals may be provided to low-nose amplifier, such as amplifier circuitry 1106a (FIG. 11) or to filter circuitry 1108a-b (FIG. 11).

In some examples, the output baseband signals 1307 and the input baseband signals 1311 may be analog baseband signals, although the scope of the examples is not limited in this respect. In some alternate examples, the output baseband signals 1307 and the input baseband signals 1311 may be digital baseband signals. In these alternate examples, the radio IC circuitry may include analog-to-digital converter (ADC) and digital-to-analog converter (DAC) circuitry.

In some dual-mode examples, a separate radio IC circuitry may be provided for processing signals for each spectrum, or for other spectrums not mentioned here, although the scope of the examples is not limited in this respect.

In some examples, the synthesizer circuitry 1304 may be a fractional-N synthesizer or a fractional N/N+1 synthesizer, although the scope of the examples is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some examples, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some examples, frequency input into synthesizer circuity 1304 may be provided by a voltage controlled oscillator (VCO), although that is not a requirement. A divider control input may further be provided by either the baseband processing circuitry 1108a-b (FIG. 11) or the application processor 1110 (FIG. 11) depending on the desired output frequency 1305. In some examples, a divider control input (e.g., N) may be determined from a look-up table (e.g., within a Wi-Fi card) based on a channel number and a channel center frequency as determined or indicated by the application processor 1110. The application processor 1110 may include, or otherwise be connected to, the example AP operation determiner 104 or the example STA operation determiner 114 of FIG. 1.

In some examples, synthesizer circuitry 1304 may be configured to generate a carrier frequency as the output frequency 1305, while in other examples, the output frequency 1305 may be a fraction of the carrier frequency (e.g., one-half the carrier frequency, one-third the carrier frequency). In some examples, the output frequency 1305 may be a LO frequency (fLO).

Figure 14:
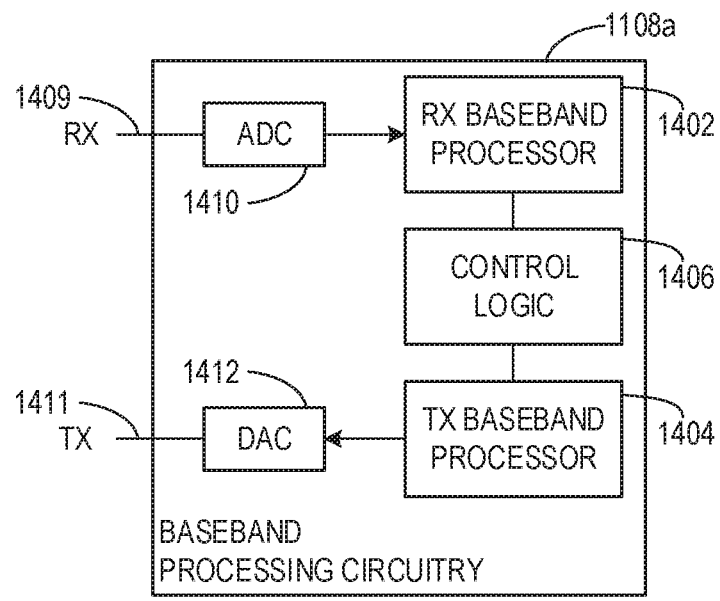
FIG. 14 illustrates an example baseband processing circuitry for use in the radio architecture of FIG. 11 in accordance with some examples.

FIG. 14 illustrates a functional block diagram of baseband processing circuitry 1108a in accordance with some examples. The baseband processing circuitry 1108a is one example of circuitry that may be suitable for use as the baseband processing circuitry 1108a (FIG. 11), although other circuitry configurations may also be suitable. The baseband processing circuitry 1108a may include a receive baseband processor (RX BBP) 1402 for processing receive baseband signals provided by the radio IC circuitry 1106a (FIG. 11) and a transmit baseband processor (TX BBP) 1404 for generating transmit baseband signals for the radio IC circuitry 1106a. The baseband processing circuitry 1108a may also include control logic 1406 for coordinating the operations of the baseband processing circuitry 1108a.

In some examples (e.g., when analog baseband signals are exchanged between the baseband processing circuitry 1108a and the radio IC circuitry 1106a), the baseband processing circuitry 1108a may include ADC 1410 to convert analog baseband signals 1409 received from the radio IC circuitry 1106a to digital baseband signals for processing by the RX BBP 1402. In these examples, the baseband processing circuitry 1108a may also include DAC 1412 to convert digital baseband signals from the TX BBP 1404 to analog baseband signals 1411.

In some examples that communicate OFDM signals or OFDMA signals, such as through baseband processor 1108a, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some examples, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some examples, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) examples, the antennas may be effectively separated to take advantage of spatial diversity and the different channel characteristics that may result. Antennas 1101 may each include a set of phased-array antennas, although examples are not so limited.

Although the radio-architecture 1100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some examples, the functional elements may refer to one or more processes operating on one or more processing elements.

Figure 15:
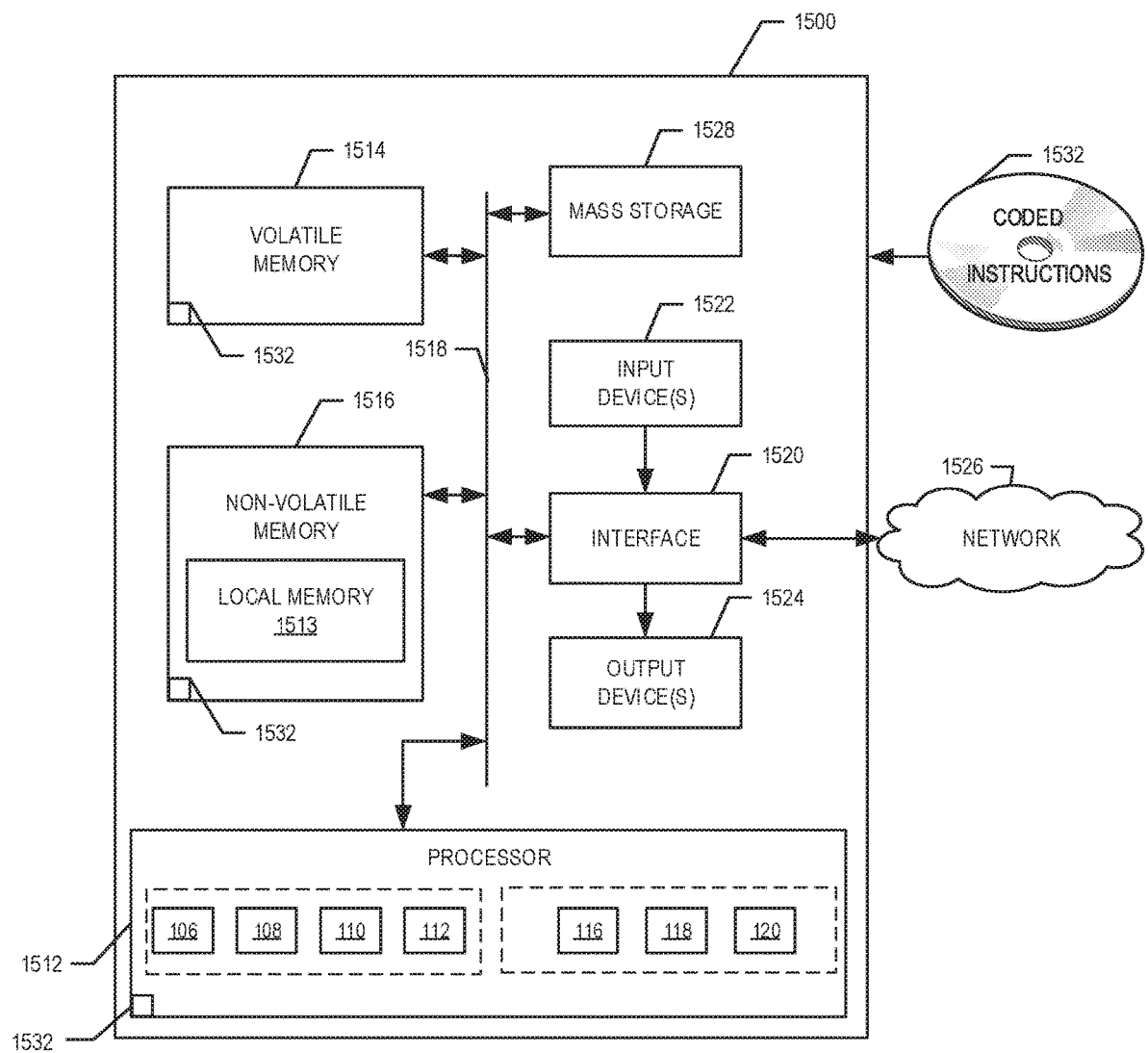
FIG. 15 is a block diagram of a processor platform structured to execute the example machine readable instructions of FIGS. 2-8 to implement the example AP operation determiner or the example STA operation determiner of FIG. 1.

FIG. 15 is a block diagram of an example processor platform 1500 capable of executing the instructions of FIG. 2-8 to implement the example AP operation determiner 104 and/or the example STA operation determiner 114 of FIG. 1. The processor platform 1500 can be, for example, a server, a personal computer, a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by integrated circuits, logic circuits, microprocessors or controllers from any desired family or manufacturer.

The processor 1512 of the illustrated example includes a local memory 1513 (e.g., a cache). The example processor 1512 of FIG. 15 executes the instructions of FIG. 2-3 to implement the example AP component interface 106, the example frame generator 108, the example communication scheduler 110, the example timer 112, the example STA component interface 116, the example parameter negotiator 118, the example communication scheduler 120, the example packet processor 122, the example packet generator 124, and/or the example communication scheduler of the example AP operation determiner 104 and/or the example STA operation determiner 114 of FIG. 1. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a clock controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 2-8 may be stored in the mass storage device 1528, in the volatile memory 1514, in the non-volatile memory 1516, and/or on a removable tangible computer readable storage medium such as a CD or DVD.

From the foregoing, it would be appreciated that the above disclosed method, apparatus, and articles of manufacture handle enhanced distributed channel access parameters. Examples disclosed herein include a new mode of operation that facilitates further control of EDCA access for STAs, which are important for Wi-Fi protocols for unlicensed operation in new frequency bands (e.g., previously licensed frequency bands). Examples disclosed herein offer a more static solution that puts requirements on the AP to ensure that the STA will have minimum performance/channel access latency, thereby reducing any effect on incumbent communication in the new frequency band.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a frame generator of an access point of a wireless network to generate a data frame instructing a station to operate using a multi-user enhanced distributed channel access (MU EDCA);
 a communication scheduler of the access point of the wireless network to instruct radio architecture to transmit the data frame to the station;
 the frame generator to generate a buffer status request requesting a buffer status of the station; and
 the communication scheduler to:
  instruct radio architecture to transmit the buffer status request to the station;
  when a response to the buffer status request corresponds to a non-null queue, schedule the station to operate using legacy EDCA; and
  when the response to the buffer status request corresponds to a null queue, continue to facilitate operation using the MU EDCA.

2. The apparatus of claim 1, wherein the communication scheduler is to negotiate at least one of the MU EDCA parameters or the legacy EDCA parameters with the station.

3. The apparatus of claim 1, wherein the communication scheduler is to:
 when network parameters have changed, determine at least one of updated legacy EDCA parameters or updated MU EDCA parameters; and
 instruct the radio architecture to transmit a data packet to the station including a count corresponding to the at least one of the updated legacy EDCA parameters of or the updated MU EDCA parameters.

4. The apparatus of claim 3, wherein the communication scheduler is to, in response to a request for the at least one of the updated legacy EDCA parameters or the updated MU EDCA parameters from the station, instruct the radio architecture to transmit the at least one of the updated legacy EDCA parameters or the updated MU EDCA parameters to the station.

5. The apparatus of claim 3, wherein the communication scheduler is to, in response to receiving a request for the at least one of the updated legacy EDCA parameters or the updated MU EDCA parameters from the station, negotiate the at least one of the updated legacy EDCA parameters or the updated MU EDCA parameters with the station.

6. The apparatus of claim 1, wherein the buffer status request is transmitted to the station after a preset duration of time for operating using the MU EDCA.

7. An apparatus comprising: a frame generator of an access point of a wireless network to generate a data frame instructing a station to operate using a multi-user enhanced distributed channel access (MU EDCA);
a communication scheduler of the access point of the wireless network to instruct radio architecture to transmit the data frame to the station;
the frame generator to generate a first buffer status request requesting a first buffer status of the station; and
the communication scheduler to:
instruct radio architecture to transmit the first buffer status request to the station;
when a response to the first buffer status request corresponds to a non-null queue, schedule the station to operate using legacy EDCA;
responsive to scheduling the station to operate using the legacy EDCA, instruct the radio architecture to transmit a second buffer status request from the station; and
when a second response to the second buffer status request corresponds to a null queue, schedule the station to operate using the MU EDCA.

8. The apparatus of claim 7, wherein the communication scheduler is to negotiate at least one of MU EDCA parameters or the legacy EDCA parameters with the station.

9. The apparatus of claim 7, wherein the communication scheduler is to:
when network parameters have changed, determine at least one of updated legacy EDCA parameters or updated MU EDCA parameters; and
instruct the radio architecture to transmit a data packet to the station including a count corresponding to the at least one of the updated legacy EDCA parameters or the updated MU EDCA parameters.

10. The apparatus of claim 9, wherein the communication scheduler is to, in response to a request for the at least one of the updated legacy EDCA parameters or the updated MU EDCA parameters from the station, instruct the radio architecture to transmit the at least one of the updated legacy EDCA parameters or the updated MU EDCA parameters to the station.

11. The apparatus of claim 9, wherein the communication scheduler is to, in response to receiving a request for the at least one of the updated legacy EDCA parameters or the updated MU EDCA parameters from the station, negotiate the at least one of the updated legacy EDCA parameters or the updated MU EDCA parameters with the station.

12. The apparatus of claim 7, wherein the buffer status request is transmitted to the station after a preset duration of time for operating using the MU EDCA.

13. A method comprising:
transmitting a data frame to a station, the data frame instructing the station to operate using a multi-user enhanced distributed channel access (MU EDCA);
transmitting a buffer status request to the station requesting a buffer status of the station;
when a response to the buffer status request corresponds to a non-null queue, scheduling the station to operate using legacy EDCA; and
when the response to the buffer status request corresponds to a null queue, continuing to operate using the MU EDCA.

14. The method of claim 13, further including negotiating at least one of MU EDCA parameters or legacy EDCA parameters with the station.

15. The method of claim 13, further including:
when network parameters have changed, determining at least one of updated legacy EDCA parameters or updated MU EDCA parameters; and
transmitting a data packet to the station including a count corresponding to the at least one of the updated legacy EDCA parameters of the updated MU EDCA parameters.

16. The method of claim 15, further including, in response to receiving a request for the at least one of the updated legacy EDCA parameters or the updated MU EDCA parameters from the station, transmitting the at least one of the updated EDCA parameters or the updated MU EDCA parameters to the station.

17. The method of claim 15, further including, in response to receiving a request for the at least one of the updated legacy EDCA parameters or the updated MU EDCA parameters from the station, negotiating the at least one of the updated legacy EDCA parameters or the updated MU EDCA parameters with the station.

18. The method of claim 13, wherein the buffer status request is transmitted to the station after a preset duration of time for operating using the MU EDCA.

19. A method comprising:
transmitting a data frame to a station, the data frame instructing the station to operate using a multi-user enhanced distributed channel access (MU EDCA);
transmitting a first buffer status request to the station requesting a first buffer status of the station;
when a response to the first buffer status request corresponds to a non-null queue, scheduling the station to operate using legacy EDCA; and
responsive to scheduling the station to operate using legacy EDCA:
transmitting a second buffer status request from the station; and
when a second response to the second buffer status request corresponds to a null queue, scheduling the station to operate using the MU EDCA.

20. The method of claim 19, further including negotiating at least one of MU EDCA parameters or legacy EDCA parameters with the station.

21. The method of claim 19, further including:
when network parameters have changed, determining at least one of updated legacy EDCA parameters or updated MU EDCA parameters; and
transmitting a data packet to the station including a count corresponding to the at least one of the updated legacy EDCA parameters of the updated MU EDCA parameters.

22. The method of claim 21, further including, in response to receiving a request for the at least one of the updated legacy EDCA parameters or the updated MU EDCA parameters from the station, transmitting the at least one of the updated EDCA parameters or the updated MU EDCA parameters to the station.

23. The method of claim 21, further including, in response to receiving a request for the at least one of the updated legacy EDCA parameters or the updated MU EDCA parameters from the station, negotiating the at least one of the updated legacy EDCA parameters or the updated MU EDCA parameters with the station.

24. The method of claim 19, wherein the buffer status request is transmitted to the station after a preset duration of time for operating using the MU EDCA.

25. A non-transitory computer readable storage medium, comprising instructions which, when executed cause a machine to at least:
- instruct radio architecture to transmit a data frame to a station, the data frame instructing the station to operate using a multi-user enhanced distributed channel access (MU EDCA);
- instruct radio architecture to transmit a buffer status request to the station requesting a buffer status of the station;
- when a response to the buffer status request corresponds to a non-null queue, schedule the station to operate using legacy EDCA;
- when the response to the buffer status request corresponds to a null queue, continue to facilitate operation using the MU EDCA.

26. The non-transitory computer readable storage medium of claim 25, wherein the instructions cause the machine to negotiate at least one of MU EDCA parameters or legacy EDCA parameters with the station.

27. A non-transitory computer readable storage medium, comprising instructions which, when executed cause a machine to at least:
- instruct radio architecture to transmit a data frame to a station, the data frame instructing the station to operate using a multi-user enhanced distributed channel access (MU EDCA);
- instruct radio architecture to transmit a first buffer status request to the station requesting a first buffer status of the station;
- when a response to the first buffer status request corresponds to a non-null queue, schedule the station to operate using legacy EDCA; and
- responsive to scheduling the station to operate using legacy EDCA:
  - instruct the radio architecture to transmit a second buffer status request from the station; and
  - when a second response to the second buffer status request corresponds to a null queue, schedule the station to operate using the MU EDCA.

28. The non-transitory computer readable storage medium of claim 27, wherein the instructions cause the machine to negotiate at least one of MU EDCA parameters or legacy EDCA parameters with the station.

* * * * *